United States Patent
Yamada

(10) Patent No.: US 10,002,436 B2
(45) Date of Patent: Jun. 19, 2018

(54) IMAGE PROCESSING DEVICE, IMAGE PROCESSING METHOD, AND SOLID-STATE IMAGING DEVICE

(71) Applicant: SONY SEMICONDUCTOR SOLUTIONS CORPORATION, Kanagawa (JP)

(72) Inventor: Hideshi Yamada, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days. days.

(21) Appl. No.: 15/505,474

(22) PCT Filed: Aug. 21, 2015

(86) PCT No.: PCT/JP2015/073467
§ 371 (c)(1),
(2) Date: Feb. 21, 2017

(87) PCT Pub. No.: WO2016/035570
PCT Pub. Date: Mar. 10, 2016

(65) Prior Publication Data
US 2017/0256067 A1 Sep. 7, 2017

(30) Foreign Application Priority Data
Sep. 3, 2014 (JP) .................. 2014-179556

(51) Int. Cl.
*G06T 7/285* (2017.01)
(52) U.S. Cl.
CPC .... *G06T 7/285* (2017.01); *G06T 2207/10021* (2013.01); *G06T 2207/20224* (2013.01)
(58) Field of Classification Search
CPC combination set(s) only.
See application file for complete search history.

(56) References Cited

U.S. PATENT DOCUMENTS

| 6,734,901 B1* | 5/2004 | Kudo | H04N 5/23248 |
| | | | 348/208.1 |
| 7,864,859 B2* | 1/2011 | Shin | H04N 19/176 |
| | | | 375/240.16 |

(Continued)

FOREIGN PATENT DOCUMENTS

| CN | 103503436 A | 1/2014 |
| EP | 2704423 A1 | 3/2014 |

(Continued)

OTHER PUBLICATIONS

International Search Report and Written Opinion of PCT Application No. PCT/JP2015/073467, dated Nov. 2, 2015, 07 pages of English Translation and 06 pages of ISRWO.

(Continued)

*Primary Examiner* — Anand Bhatnagar
(74) *Attorney, Agent, or Firm* — Chip Law Group

(57) ABSTRACT

The present disclosure relates to an image processing device, an image processing method, and a solid-state imaging device capable of detecting image information with high accuracy by using images with different shooting conditions. A difference detection unit detects difference information of a short exposure image of a current frame and a past frame shot in a short exposure time. The difference detection unit detects difference information of a long exposure image of a current frame and a past frame shot in a long exposure time. The combining unit combines the difference information of the short exposure image and the difference information of the long exposure image on the basis of the short exposure image or the long exposure image and generates a motion vector of the current frame on the basis of the combined difference information. The present disclosure may be applied to the image processing apparatus and the like, for example.

19 Claims, 23 Drawing Sheets

(56) References Cited

U.S. PATENT DOCUMENTS

| | | | | |
|---|---|---|---|---|
| 8,335,258 | B2* | 12/2012 | Okumura | G09G 3/20 375/240.12 |
| 8,885,922 | B2* | 11/2014 | Ito | H04N 13/0011 348/42 |
| 9,230,176 | B2* | 1/2016 | Choi | G06T 7/20 |
| 2003/0174769 | A1* | 9/2003 | Nagumo | H04N 19/105 375/240.02 |
| 2006/0182355 | A1* | 8/2006 | Shin | H04N 19/176 382/236 |
| 2006/0262853 | A1* | 11/2006 | Li | H04N 19/513 375/240.16 |
| 2009/0103630 | A1* | 4/2009 | Fuchikami | H04N 5/772 375/240.25 |
| 2010/0054336 | A1* | 3/2010 | Okumura | G09G 3/20 375/240.16 |
| 2010/0182410 | A1* | 7/2010 | Verburgh | G06T 7/0071 348/51 |
| 2010/0271515 | A1* | 10/2010 | Imagawa | H04N 5/144 348/266 |
| 2011/0273531 | A1* | 11/2011 | Ito | H04N 13/026 348/43 |
| 2012/0321171 | A1* | 12/2012 | Ito | H04N 13/0011 382/154 |
| 2014/0049657 | A1* | 2/2014 | Fukunishi | H04N 5/23254 348/208.4 |

FOREIGN PATENT DOCUMENTS

| | | |
|---|---|---|
| JP | 2011-117787 A | 6/2011 |
| JP | 2012-100066 A | 5/2012 |
| JP | 2012-235197 A | 11/2012 |
| WO | 2012/147719 A1 | 11/2012 |

OTHER PUBLICATIONS

International Preliminary Report on Patentability of PCT Application No. PCT/JP2015/073467, dated Mar. 16, 2017, 08 pages of English Translation and 04 pages of IPRP.

* cited by examiner

IMAGE PROCESSING DEVICE, IMAGE PROCESSING METHOD, AND SOLID-STATE IMAGING DEVICE

CROSS REFERENCE TO RELATED APPLICATIONS

This application is a U.S. National Phase of International Patent Application No. PCT/JP2015/073467 filed on Aug. 21, 2015, which claims priority benefit of Japanese Patent Application No. JP 2014-179556 filed in the Japan Patent Office on Sep. 3, 2014. Each of the above-referenced applications is hereby incorporated herein by reference in its entirety.

TECHNICAL FIELD

The present disclosure relates to an image processing device, an image processing method, and a solid-state imaging device, and especially relates to the image processing device, the image processing method, and the solid-state imaging device capable of detecting image information with high accuracy by using images with different shooting conditions.

BACKGROUND ART

There is an imaging device such as a digital camera which shoots a moving image of a subject and detects a motion vector between frames of the moving image, thereby detecting motion of the subject and estimating a motion amount of an entire screen. In such imaging device, it is possible to realize a gesture user interface (UI) function to operate an electronic device by motion of a finger by using the finger as the subject and realize a function to correct camera shake by using the motion vector of the entire screen.

A block matching method is generally used as a method of detecting the motion vector between the frames. The block matching method is the method of detecting a vector between positions on a screen of blocks of two-frame image with minimum difference as the motion vector. Therefore, in the block matching method, when the images the difference therebetween is to be obtained change due to a cause other than the motion, the detection accuracy of the motion vector is deteriorated. For example, when a moving speed of the subject changes temporally and a blur amount of the subject is different between the images of the two frames, difference becomes larger even between the blocks of the same subject and the detection accuracy of the motion vector is deteriorated.

Therefore, a method of detecting the motion vector by using the images of the same frame with different exposure times is considered (for example, refer to Patent Document 1). In this method, the motion vector is detected supposing that the difference between the images of the same frame with the different exposure times is generated on the basis of difference in the exposure time and the motion vector of the subject.

However, in the method in Patent Document 1, when the difference in the exposure time is small, the difference between the images of the same frame with the different exposure times becomes small and the accuracy of the motion vector is deteriorated. On the other hand, when the difference in the exposure time is large, accuracy of a linear equation obtained by approximating each image supposing that the difference between the images of the same frame with the different exposure times is generated on the basis of the difference in the exposure time and the motion vector of the subject is deteriorated and the accuracy of the motion vector is deteriorated.

Also, it is not considered to generate a depth map indicating a depth value of each pixel with high accuracy by using the images with different shooting conditions such as the exposure time.

CITATION LIST

Patent Document

Patent Document 1: Japanese Patent Application Laid-Open No. 2013-20584

SUMMARY OF THE INVENTION

Problems to be Solved by the Invention

Therefore, it is desired to detect image information such as the motion vector and the depth map with high accuracy by using the images with the different shooting conditions such as the exposure time.

The present disclosure is achieved in view of such a condition and an object thereof is to detect the image information with high accuracy by using the images with the different shooting conditions.

Solutions to Problems

An image processing device according to a first aspect of the present disclosure is an image processing device provided with a first difference detection unit which detects difference information of a first image of first and second frames shot with a first shooting condition, a second difference detection unit which detects difference information of a second image of the first and second frames shot with a second shooting condition, and a combining unit which combines the difference information of the first image detected by the first difference detection unit and the difference information of the second image detected by the second difference detection unit on the basis of the first or second image and generates a motion vector of the first frame on the basis of the combined difference information.

An image processing method according to the first aspect of the present disclosure corresponds to the image processing device according to the first aspect of the present disclosure.

In the first aspect of the present disclosure, difference information of a first image of first and second frames shot with a first shooting condition is detected, difference information of a second image of the first and second frames shot with a second shooting condition is detected, and the difference information of the first image and the difference information of the second image are combined on the basis of the first or second image and a motion vector of the first frame is generated on the basis of the combined difference information.

A solid-state imaging device according to a second aspect of the present disclosure is a solid-state imaging device provided with a shooting unit which shoots with first and second shooting conditions, a first difference detection unit which detects difference information of a first image of first and second frames shot by the shooting unit with the first shooting condition, a second difference detection unit which detects difference information of a second image of the first and second frames shot by the shooting unit with the second shooting condition, and a combining unit which combines the difference information of the first image detected by the first difference detection unit and the difference information of the second image detected by the second difference detection unit on the basis of the first or second image and generates a motion vector of the first frame on the basis of the combined difference information.

In the second aspect of the present disclosure, shooting is performed with first and second shooting conditions, difference information of a first image of first and second frames shot with the first shooting condition is detected, difference information of a second image of the first and second frames shot with the second shooting condition is detected, and the difference information of the first image and the difference information of the second image are combined on the basis of the first or second image and a motion vector of the first frame is generated on the basis of the combined difference information.

An image processing device according to a third aspect of the present disclosure is an image processing device provided with a first difference detection unit which detects difference information between a left-eye image and a right-eye image shot with a first shooting condition, a second difference detection unit which detects difference information between the left-eye image and the right-eye image shot with a second shooting condition, and a combining unit which combines the difference information with the first shooting condition detected by the first difference detection unit and the difference information with the second shooting condition detected by the second difference detection unit on the basis of the left-eye image shot with the first or second shooting condition or the right-eye image shot with the first or second shooting condition and generates the combined difference information as a depth value.

An image processing method according to the third aspect of the present disclosure corresponds to the image processing device according to the third aspect of the present disclosure.

In the third aspect of the present disclosure, difference information between a left-eye image and a right-eye image shot with a first shooting condition is detected, difference information between the left-eye image and the right-eye image shot with a second shooting condition is detected, and the difference information with the first shooting condition and the difference information with the second shooting condition are combined on the basis of the left-eye image shot with the first or second shooting condition or the right-eye image shot with the first or second shooting condition are combined and the combined difference information is generated as a depth value.

A solid-state imaging device according to a fourth aspect of the present disclosure is a solid-state imaging device provided with a shooting unit which shoots a left-eye image and a right-eye image with first and second shooting conditions, a first difference detection unit which detects difference information between the left-eye image and the right-eye image shot by the shooting unit with the first shooting condition, a second difference detection unit which detects difference information between the left-eye image and the right-eye image shot by the shooting unit with the second shooting condition, and a combining unit which combines the difference information with the first shooting condition detected by the first difference detection unit and the difference information with the second shooting condition detected by the second difference detection unit on the basis of the left-eye image shot with the first or second shooting condition or the right-eye image shot with the first or second shooting condition and generates the combined difference information as a depth value.

Meanwhile, the image processing device according to the first and third aspects may be realized by execution of a program by a computer.

Also, the program executed by the computer for realizing the image processing device according to the first and third aspects may be provided by transmission through a transmission medium or recording in a recording medium.

Effects of the Invention

According to the first to fourth aspects of the present disclosure, it is possible to perform image processing. Also, according to the first to fourth aspects of the present disclosure, it is possible to detect the image information with high accuracy by using the images with the different shooting conditions.

Meanwhile, the effect is not necessarily limited to that herein described and may be any effect described in the present disclosure.

MODE FOR CARRYING OUT THE INVENTION

A mode for carrying out the present disclosure (hereinafter, referred to as an embodiment) is hereinafter described. Meanwhile, the description is given in the following order.
1. First Embodiment: Digital Camera (FIGS. 1 to 10)
2. Second Embodiment: Digital Camera (FIGS. 11 and 15)
3. Third Embodiment: Digital Camera (FIGS. 16 to 18)
4. Fourth Embodiment: Digital Camera (FIGS. 19 to 23)
5. Fifth Embodiment: Computer (FIG. 24)

First Embodiment (Configuration Example of First Embodiment of Digital Camera)

Figure 1:
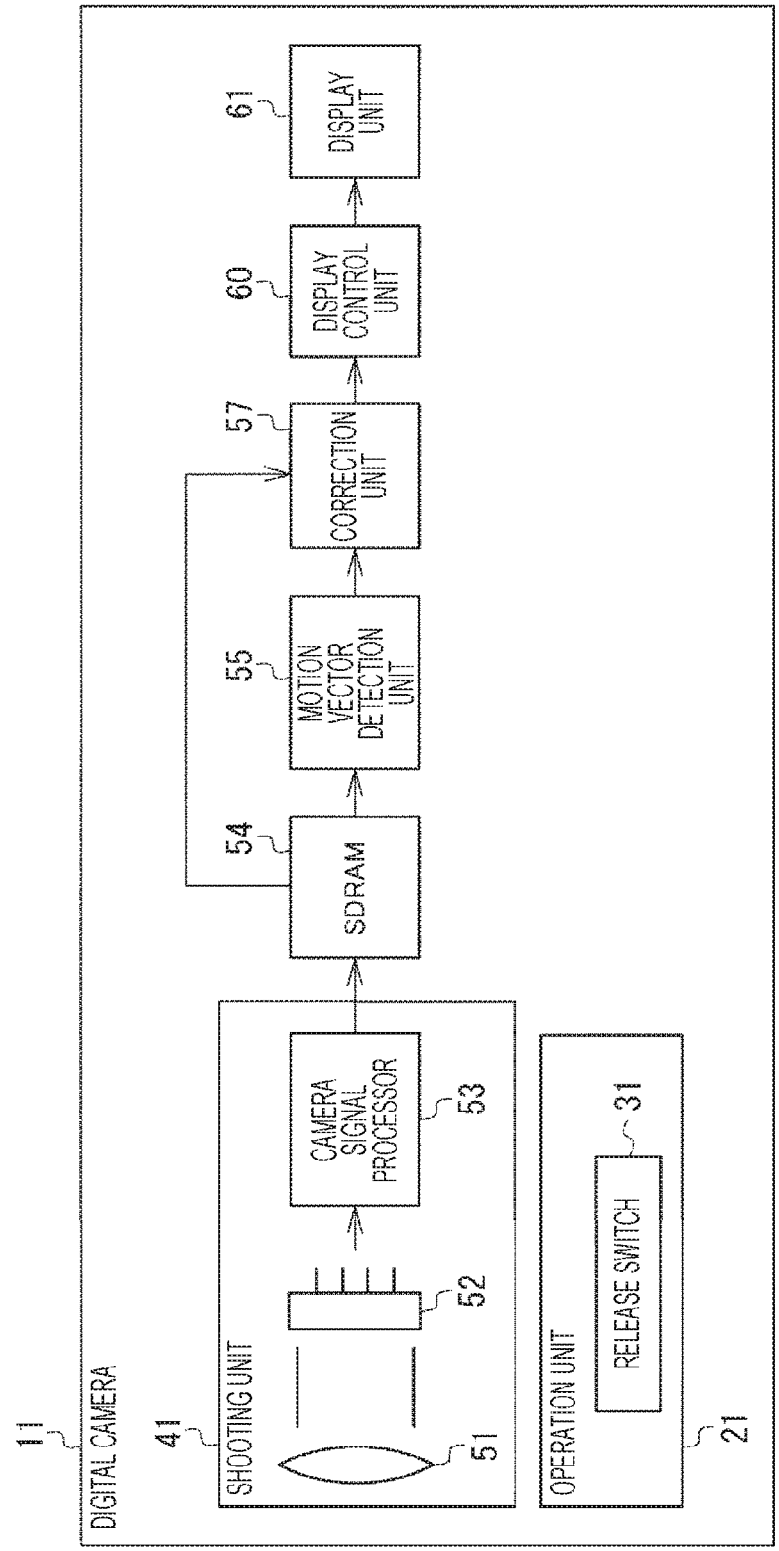
FIG. 1 is a block diagram illustrating a configuration example of a first embodiment of a digital camera as a solid-state imaging device to which the present disclosure is applied.

FIG. 1 is a block diagram illustrating a configuration example of a first embodiment of a digital camera as a solid-state imaging device to which the present disclosure is applied.

A digital camera 11 in FIG. 1 is formed of an operation unit 21, a shooting unit 41, a synchronous dynamic random access memory (SDRAM) 54, a motion vector detection unit 55, a correction unit 57, a display control unit 60, and a display unit 61. The digital camera 11 shoots in a relatively short exposure time (hereinafter, referred to as a short exposure time) and shoots in a relatively long exposure time (hereinafter, referred to as a long exposure time).

The operation unit 21 formed of a release switch 31, a touch panel not illustrated superimposed on the display unit 61 to be described later and the like, for example, is operated by a user. The operation unit 21 supplies an operation signal according to operation of the user to a necessary block of the digital camera 11.

The shooting unit 41 is formed of an imaging lens 51, an image sensor 52, and a camera signal processor 53.

The imaging lens 51 of the shooting unit 41 forms an image of a subject on a light receiving surface of the image sensor 52. The image sensor 52 is formed of a charge coupled devices (CCD) sensor, a complementary metal oxide semiconductor (CMOS) sensor and the like, for example. The image sensor 52 performs photoelectric conversion on the image (light) of the subject formed on the light receiving surface thereof in pixel unit and stores a charge obtained as a result.

Herein, the exposure time of a part of pixels of the image sensor 52 is the short exposure time and the exposure time of remaining pixels is the long storage exposure time. The image sensor 52 reads an electric signal of the charge stored in the short exposure time in the pixel the exposure time of which is the short exposure time (hereinafter, referred to as a short storage pixel) as a pixel signal, thereby shooting in the short exposure time for each pixel.

The image sensor 52 also reads the electric signal of the charge stored in the long exposure time in the pixel the exposure time of which is the long exposure time (hereinafter, referred to as a long storage pixel) as the pixel signal, thereby shooting in the long exposure time for each frame. The image sensor 52 supplies the pixel signals of the short storage pixel and the long storage pixel in frame unit read as a result of shooting to the camera signal processor 53 as an image signal.

The camera signal processor 53 performs gamma correction processing, white balance processing and the like, for example, on an analog image signal supplied from the image sensor 52. The camera signal processor 53 performs analog/digital (A/D) conversion on the analog image signal obtained as a result to generate a digital image signal and supplies the image signal to the SDRAM 54 as a long/short exposure image in frame unit.

The SDRAM 54 stores the long/short exposure image in frame unit supplied from the camera signal processor 53.

The motion vector detection unit 55 (image processing device) reads the long/short exposure image of a current frame from the SDRAM 54. The motion vector detection unit 55 detects a motion vector of the current frame on the basis of the long/short exposure image of the current frame read from the SDRAM 54. The motion vector detection unit 55 supplies the detected motion vector to the correction unit 57.

The correction unit 57 reads the long/short exposure image of the current frame from the SDRAM 54. The correction unit 57 generates a shot image with a wide dynamic range by using the read long/short exposure image. The correction unit 57 corrects the generated shot image on the basis of the motion vector supplied from the motion vector detection unit 55 and supplies the same to the display control unit 60.

The display control unit 60 supplies the shot image supplied from the correction unit 57 to the display unit 61 to display.

The display unit 61 displays the shot image and the like according to control of the display control unit 60. A liquid crystal display (LCD) and the like may be adopted, for example, as the display unit 61.

(Arrangement Example of Short Storage Pixel and Long Storage Pixel)

Figure 2:
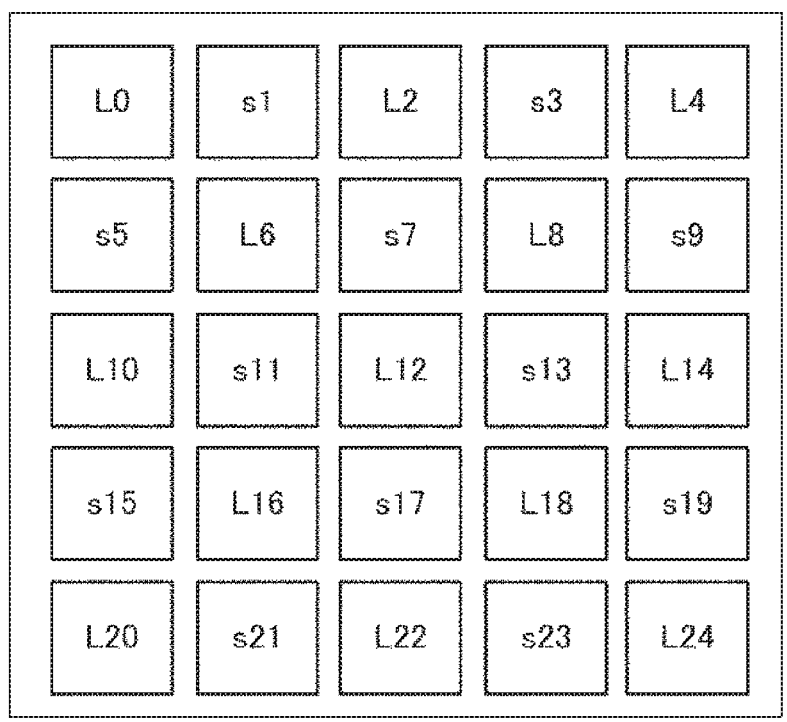
FIG. 2 is a view illustrating an arrangement example of a short storage pixel and a long storage pixel.

FIG. 2 is a view illustrating an arrangement example of the short storage pixel and the long storage pixel.

In FIG. 2, a square represents the pixel. L found in the square indicates that the pixel represented by the square is the long storage pixel and a number next to L is a value indicating a position of the long storage pixel. Also, s found in the square indicates that the pixel represented by the square is the short storage element and a number next to s is a value indicating a position of the short storage pixel. Meanwhile, only five by five pixels out of the pixels of the image sensor 52 are illustrated in FIG. 2 for the purpose of illustration.

As illustrated in FIG. 2, the long storage pixels and the short storage pixels are regularly arranged. In the example in FIG. 2, the long storage pixel and the short storage pixel are alternately arranged in a horizontal direction and in a vertical direction.

(Configuration Example of Motion Vector Detection Unit)

Figure 3:
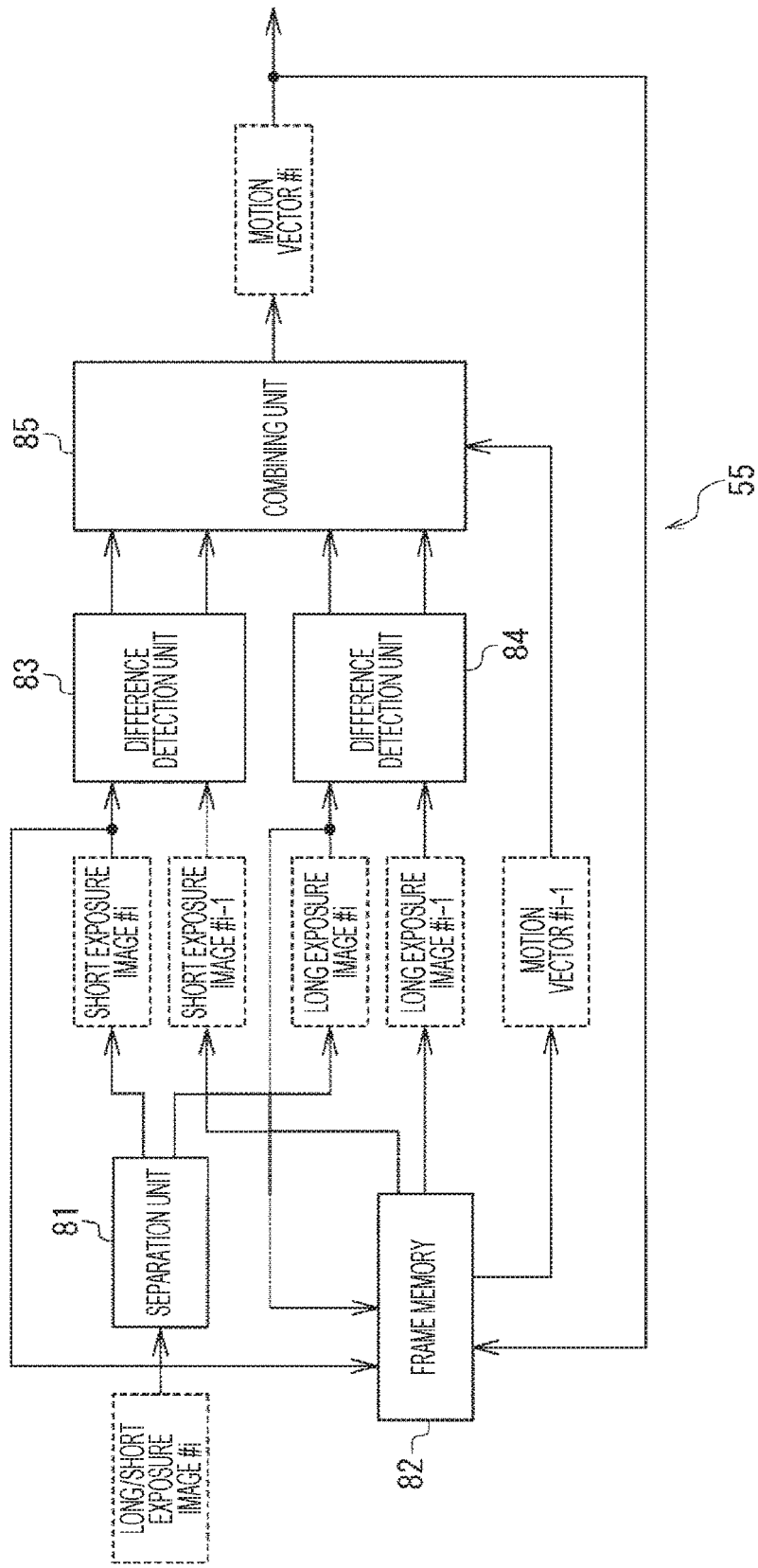
FIG. 3 is a block diagram illustrating a configuration example of a motion vector detection unit in FIG. 1.

FIG. 3 is a block diagram illustrating a configuration example of the motion vector detection unit 55 in FIG. 1.

The motion vector detection unit 55 in FIG. 3 is formed of a separation unit 81, a frame memory 82, a difference detection unit 83, a difference detection unit 84, and a combining unit 85.

The separation unit 81 of the motion vector detection unit 55 makes an ith frame the current frame (first frame) and reads a long/short exposure image #i being the long/short exposure image of the ith frame from the SDRAM 54. The separation unit 81 separates a pixel value of the short storage pixel and a pixel value of the long storage pixel from the read long/short exposure image #i. The separation unit 81 supplies a short exposure image #i formed of the separated pixel value of the short storage pixel to the frame memory 82 and the difference detection unit 83. The separation unit 81 also supplies a long exposure image #i formed of the separated pixel value of the long storage pixel to the frame memory 82 and the difference detection unit 84.

Meanwhile, since the separation unit 81 herein generates the short exposure image #i by using the separated pixel value of the short storage pixel as-is, resolution of the short exposure image #i is lower than that of the long/short exposure image #i. That is to say, since there is no pixel value in the position of the long storage pixel in the short exposure image #i, when the short storage pixel and the long storage pixel are arranged as illustrated in FIG. 2, for example, the resolution of the short exposure image #i is half the resolution of the long/short exposure image #i.

The separation unit 81 may also generate the short exposure image #i having the same resolution as that of the long/short exposure image #i by performing bi-linear interpolation and the like on the pixel value in the position of the long storage pixel by using the pixel value of the short storage pixel around the same. This is similar for the long exposure image #i.

The frame memory 82 holds a short exposure image #i−1 and a long exposure image #i−1 being the short exposure image and the long exposure image of an (i−1)th frame, respectively, supplied from the separation unit 81 when the (i−1)th frame is made the current frame. The frame memory 82 also holds a motion vector #i−1 of the (i−1)th frame supplied from the combining unit 85 when the (i−1)th frame is made the current frame.

The frame memory 82 also holds the short exposure image #i and the long exposure image #i supplied from the separation unit 81. The short exposure image #i and the long exposure image #i are read to be used when the current frame is an (i+1)th frame.

The difference detection unit 83 reads the short exposure image #i−1 of the (i−1)th frame being one frame before the current frame (hereinafter, referred to as a past frame (second frame) from the frame memory 82. The difference detection unit 83 generates a SAD table according to a block matching method by using the read short exposure image #i−1 and the short exposure image #i supplied from the separation unit 81.

Specifically, the difference detection unit 83 divides the short exposure image #i into blocks each having a predetermined size and makes the same standard image blocks. The difference detection unit 83 also divides the short exposure image #i−1 into blocks of the same size as the size of the standard image block and makes the same reference image blocks. The difference detection unit 83 makes a rectangular area around a center of the standard image block an area to be searched for each standard image block. The difference detection unit 83 (first difference detection unit) detects a sum of absolute differences (SAD value) of respective pixels between the standard image block and each of a plurality of reference image blocks a center of which is located within the area to be searched of the standard image block as difference information for each standard image block. The difference detection unit 83 generates the SAD table in which a vector indicating a relative position of a pair of the standard image block and each reference image block within the area to be searched and the difference information of the pair are associated with each other for each standard image block.

The difference detection unit 83 supplies the standard image block and the SAD table to the combining unit 85 for each standard image block.

The difference detection unit 84 reads the long exposure image #i−1 of the past frame from the frame memory 82. The difference detection unit 84 generates the SAD table for each standard image block according to the block matching method as is the case with the difference detection unit 83 by using the read long exposure image #i−1 and the long exposure image #i supplied from the separation unit 81. The difference detection unit 84 supplies the standard image block and the SAD table to the combining unit 85 for each standard image block.

The combining unit 85 reads the motion vector #i−1 of the past frame from the frame memory 82. The combining unit 85 combines the SAD table supplied from the difference detection unit 83 and the SAD table supplied from the difference detection unit 84 on the basis of the standard image blocks supplied from the difference detection units 83 and 84 and the motion vector #i−1 for each standard image block. The combining unit 85 detects the vector indicating the relative position of the pair corresponding to minimum difference information as the motion vector #i of the current frame on the basis of the combined SAD table for each standard image block.

The combining unit 85 supplies the generated motion vector #i to the correction unit 57 in FIG. 1 and supplies the same to the frame memory 82 to hold. The motion vector #i held in the frame memory 82 is read to be used as the motion vector of the past frame when the current frame is the (i+1)th frame.

(Description of Generation Process of SAD Table)

Figure 4:
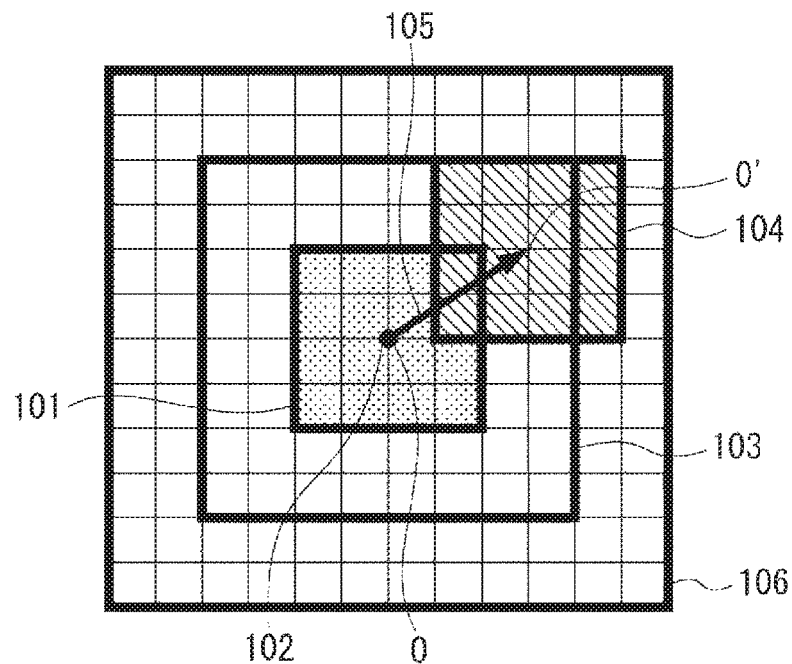
FIG. 4 is a view illustrating a generation process of a SAD table by a difference detection unit in FIG. 3.

FIG. 4 is a view illustrating a generation process of the SAD table by the difference detection units 83 and 84 in FIG. 3.

In FIG. 4, a minimum square represents the pixel. In an example in FIG. 4, each of a standard image block 101 and a reference image block 104 includes four by four pixels and an area to be searched 103 includes eight by eight pixels. This is similar for FIG. 5 to be described later.

In this case, the number of reference image blocks 104 a center O' of which is located within the area to be searched 103 is 81 (nine by nine). Therefore, the difference information between the standard image block 101 and each of the 81 reference image blocks 104 the center O' of which is located within the area to be searched 103 is generated. That is to say, the number of pieces of the difference information to be generated is equal to a product of a value obtained by adding one to the number of pixels in the horizontal direction and of value obtained by adding one to the number of pixels in the vertical direction within the area to be searched 103.

Also, the relative positions of the standard image block 101 and the reference image block 104 the center O' of which is located within the area to be searched 103 may be indicated by a vector 105 from a position of a center O of the standard image block 101 to the center O' of the reference image block 104.

Therefore, in the SAD table, the difference information between the standard image block 101 and the reference image block 104 in the relative positions indicated by the vector 105 is registered in association with the vector 105. The vector 105 with the minimum difference information out of the vectors 105 registered in the SAD table is the motion vector detected by the SAD table.

Meanwhile, a matching process area 106 being an area of the pixels forming the 81 reference image blocks 104 the center O' of each of which is located within the area to be searched 103 includes 12 by 12 pixels. That is to say, the number of pixels in the horizontal direction of the matching process area 106 is a value obtained by adding the number of pixels in the horizontal direction of the reference image block 104 to the number of pixels in the horizontal direction of the area to be searched 103 and the number of pixels in the vertical direction may also be obtained as is the case with the horizontal direction.

(Description of Detection Accuracy of Motion Vector)

Figure 5:
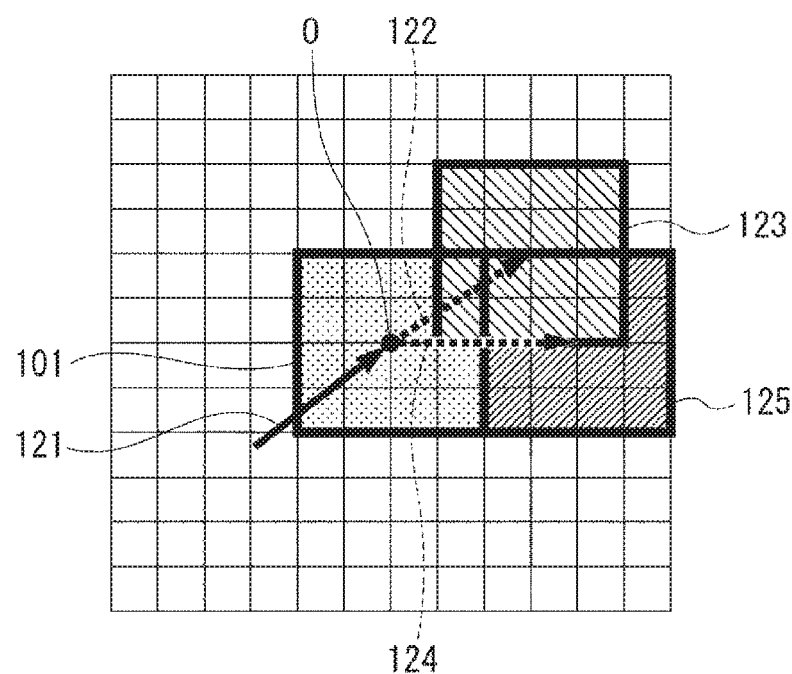
FIG. 5 is a view illustrating an example of a standard image block and a reference image block.
Figure 6:
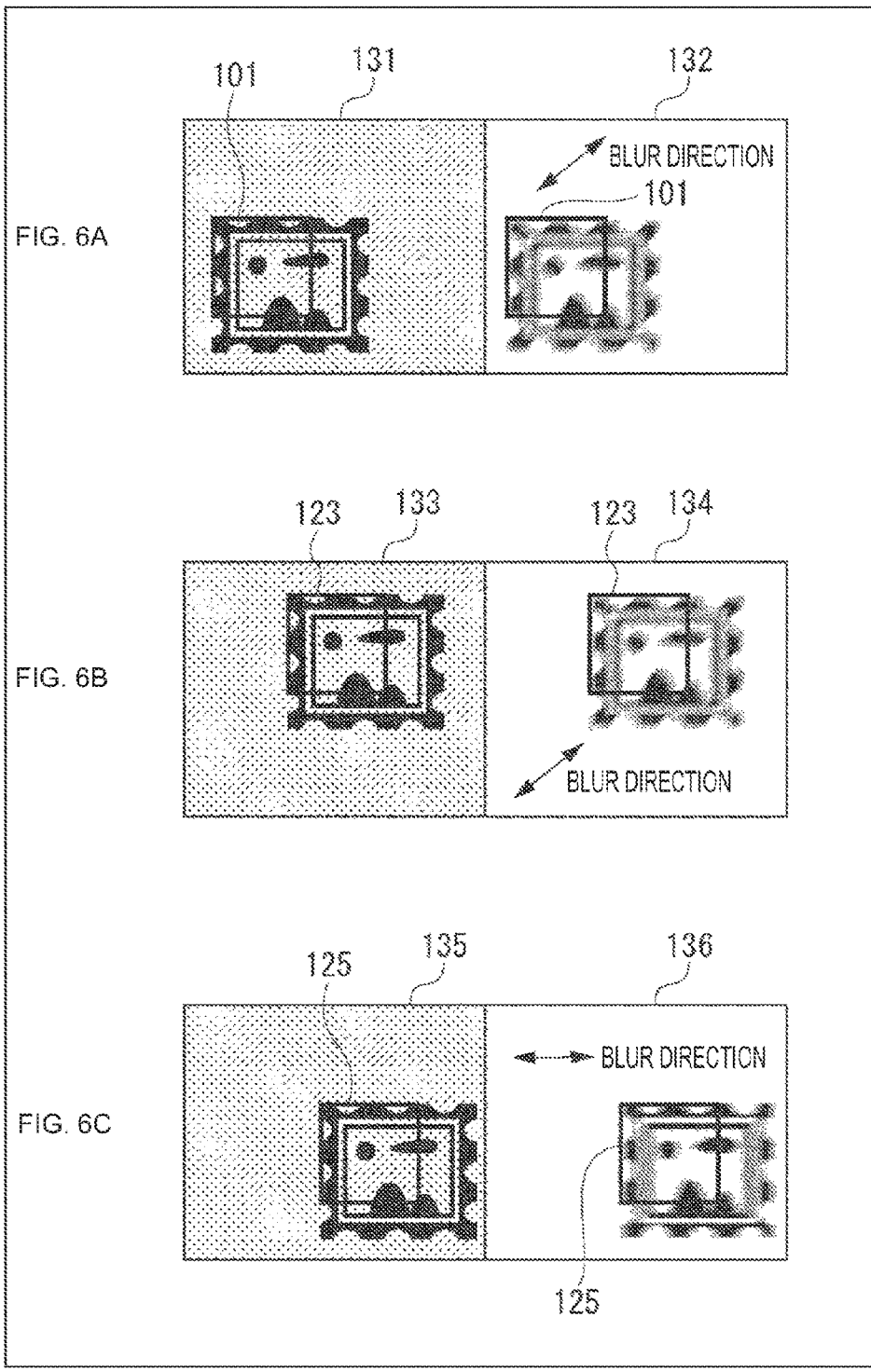
FIGS. 6A, 6B and 6C are views illustrating an example of a long exposure image and a short exposure image.

FIG. 5 is a view illustrating examples of the standard image block and the reference image block when the motion vector of the current frame is the same as the motion vector of the past frame and when they are different from each other, and FIGS. 6A, 6B and 6C are views illustrating an example of the long exposure image and the short exposure image.

Meanwhile, in FIG. 5, the same reference sign is assigned to a configuration the same as that in FIG. 4. Overlapping description is appropriately omitted.

As illustrated in FIG. 5, when a motion vector 122 of the current frame is the same as a motion vector 121 in an upper right direction of the past frame, the difference information corresponding to the motion vector 122 is the difference information between the standard image block 101 and a reference image block 123.

In this case, motion blur generated in the standard image block 101 and the motion blur generated in the reference image block 123 are substantially the same and the pixel value of each pixel of the standard image block 101 and that of the reference image block 123 are substantially the same.

Therefore, as illustrated in FIG. 6A and FIG. 6B, difference between the standard image block 101 in a short exposure image 131 of the current frame and the reference image block 123 in a short exposure image 133 of the past frame is noise only. In the long exposure image similarly, the difference between the standard image block 101 in a long exposure image 132 of the current frame and the reference image block 123 in a long exposure image 134 of the past frame is noise only.

Therefore, it is more likely that the difference information of the pair of the standard image block 101 and the reference image block 123 is minimum and the motion vector 122 is detected in a case in which the motion vector is detected by using the SAD table of the long exposure image 134 with a better SN ratio as compared to a case in which the SAD table of the short exposure image 133 with a worse SN ratio is used.

As described above, when the motion vector 122 of the current frame is substantially the same with the motion vector 121 of the past frame, the difference in motion blur between the long exposure image 132 and the long exposure image 134 is negligibly small. Therefore, detecting the motion vector by using the SAD table of the long exposure image 134 realizes higher detection accuracy than that in the case in which the SAD table of the short exposure image 133 is used.

On the other hand, when a motion vector 124 of the current frame is the motion vector to the right different from the motion vector 121 in the upper right direction of the past frame, the difference information corresponding to the motion vector 124 is the difference information between the standard image block 101 and a reference image block 125.

In this case, the motion blur generated in the standard image block 101 and the motion blur generated in the reference image block 125 are different from each other. Therefore, as illustrated in FIG. 6A and FIG. 6C, the difference between the standard image block 101 of the long exposure image 132 of the current frame and the reference image block 125 of the long exposure image 136 of the past frame in which the motion blur is generated for a long time is large. Therefore, there is a case in which the difference information of the pair of the standard image block 101 of the long exposure image 132 and the reference image block 125 of the long exposure image 136 is not minimum and the motion vector 124 cannot be detected.

However, the difference between the standard image block 101 of the short exposure image 131 of the current frame and the reference image block 125 of the short exposure image 135 of the past frame in which the motion blur is generated only for a short time is small. Therefore, it is more likely that the difference information of the pair of the standard image block 101 of the short exposure image 135 and the reference image block 125 of the short exposure image 135 is minimum and the motion vector 124 is detected.

As described above, when the motion vector 124 of the current frame is different from the motion vector 121 of the past frame, the motion blur between the short exposure images 131 and 135 is smaller than that between the long exposure images 132 and 136. Therefore, detecting the motion vector by using the SAD table of the short exposure image 135 realizes the higher detection accuracy than that in a case in which the SAD table of the long exposure image 136 is used.

Therefore, the combining unit 85 in FIG. 3 combines the SAD tables of the long exposure image and the short exposure image on the basis of relationship between the past motion vector and the vector registered in the SAD table.

Also, although not illustrated, detecting the motion vector by using the SAD table with the better SN ratio out of the long exposure image and the short exposure image realizes the higher detection accuracy of the motion vector than that in a case in which the SAD table with the worse SN ratio is used.

When luminance is high, detecting the motion vector by using the SAD table of the short exposure image in which white out is less likely to occur realizes the higher detection accuracy of the motion vector as compared to a case in which the SAD table of the long exposure image is used. On the other hand, when the luminance is low, detecting the motion vector by using the SAD table of the long exposure image in which black crush is less likely to occur realizes the higher detection accuracy of the motion vector as compared to a case in which the SAD table of the short exposure image is used.

When contrast is low, if the motion vector is detected by using the SAD table of the long exposure image in which the motion blur is generated for a long time, it is more likely that the motion vector is erroneously detected by the difference between the pixel values by the motion blur as compared to a case in which the SAD table of the short exposure image is used. This is similar for a case in which the motion vector is large, that is to say, motion is fast.

From above, the combining unit 85 combines the SAD tables of the long exposure image and the short exposure image on the basis of the SN ratios, the luminance, and the contrast of the long exposure image and the short exposure image, and the motion vector of the past frame.

(Configuration Example of Combining Unit)

Figure 7:
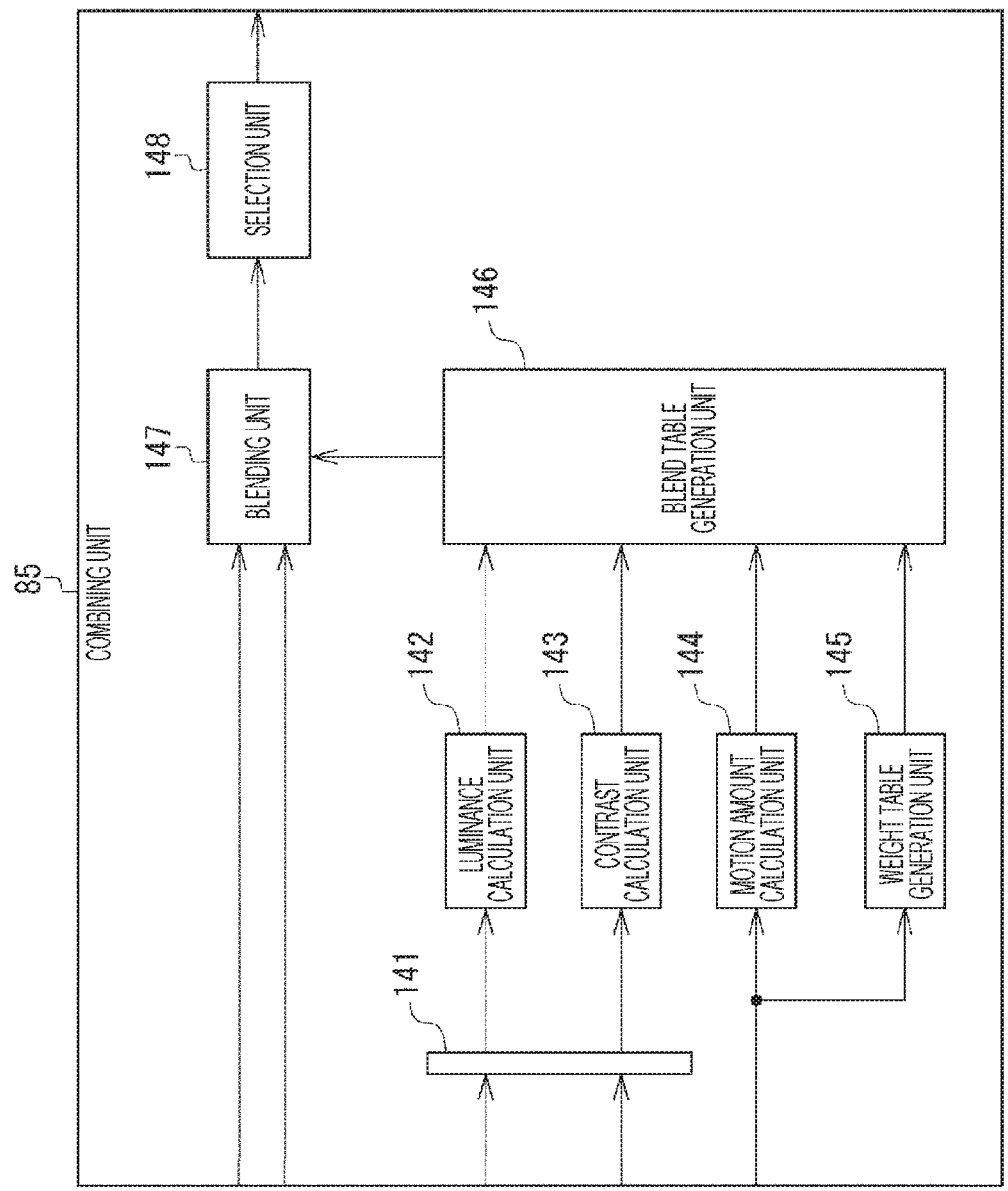
FIG. 7 is a block diagram illustrating a configuration example of a combining unit in FIG. 3.

FIG. 7 is a block diagram illustrating a configuration example of the combining unit 85 in FIG. 3.

The combining unit 85 in FIG. 7 is formed of a selection unit 141, a luminance calculation unit 142, a contrast calculation unit 143, a motion amount calculation unit 144, a weight table generation unit 145, a blend table generation unit 146, a blending unit 147, and a selection unit 148.

The selection unit 141 of the combining unit 85 selects one of the pixel value of the short exposure image #i supplied from the difference detection unit 83 in FIG. 3 and the pixel value of the long exposure image #i supplied from the difference detection unit 84 in FIG. 3 with the better SN ratio for each pixel of the standard image block.

That is to say, the SN ratio of the short exposure image is determined in advance for the pixel value of the short exposure image and the SN ratio of the long exposure image is determined in advance for the pixel value of the long exposure image. Therefore, the selection unit 141 compares the SN ratio based on the pixel value of the short exposure image #i and the SN ratio based on the pixel value of the long exposure image #i and selects one of the better SN ratio for each pixel of the standard image block. The selection unit 141 supplies the selected pixel value of each pixel of the standard image block to the luminance calculation unit 142 and the contrast calculation unit 143.

The luminance calculation unit 142 obtains an average value BlockAve of the pixel values (luminance values) of the standard image block supplied from the selection unit 141. The luminance calculation unit 142 determines a luminance blend value BlendL by following equation (1) on the basis of the average value BlockAve and supplies the same to the blend table generation unit 146.

[Mathematical Formula 1]

$\text{Blend}L = 0.0 \text{(when BlockAve} > Th1 \text{ is satisfied)}$ $\text{Blend}L = (Th1 - \text{BlockAve})/(Th1 - Th2) \text{(when } Th2 \leq \text{BlockAve} \leq Th1 \text{ is satisfied)}$ $\text{Blend}L = 1.0 \text{(when BlockAve} < Th2 \text{ is satisfied)} \quad (1)$ In equation (1), Th1 and Th2 represent predetermined thresholds; the threshold Th1 is larger than the threshold Th2.

The contrast calculation unit 143 obtains a contrast value BlockCont by following equation (2) on the basis of the pixel values of the standard image block supplied from the selection unit 141.

[Mathematical Formula 2]

$\text{BlockCont} = \Sigma \text{Abs}(I(x,y) - I(x+1,y)) + \Sigma \text{Abs}(I(x,y) - I(x,y+1)) \quad (2)$ In equation (2), I(x,y) represents the pixel value of the pixel in a position (x,y). According to equation (2), the contrast value BlockCont is a sum of an integrated value of absolute differences of the pixel values of the pixels adjacent to each other in the horizontal direction and an integrated value of absolute differences of the pixel values of the pixels adjacent to each other in the vertical direction out of the pixel values of the standard image block.

Also, the contrast calculation unit 143 determines a contrast blend value BlendC by equation (3) on the basis of the contrast value BlockCont and supplies the same to the blend table generation unit 146.

[Mathematical Formula 3]

$\text{Blend}C = 1.0 \text{(when BlockCont} > Th3 \text{ is satisfied)}$ $\text{Blend}C = (Th3 - \text{BlockCont})/(Th3 - Th4) \text{(when } Th4 \leq \text{BlockCont} \leq Th3 \text{ is satisfied)}$ $\text{Blend}C = 0.0 \text{(when BlockCont} < Th4 \text{ is satisfied)} \quad (3)$ In equation (3), Th3 and Th4 represent predetermined threshold; the threshold Th3 is larger than the threshold Th4.

The motion amount calculation unit 144 reads the motion vector #i−1 from the frame memory 82 in FIG. 3. The motion amount calculation unit 144 obtains a norm value MvNorm by following equation (4) on the basis of the read motion vector #i−1.

[Mathematical Formula 4]

$\text{MvNorm} = \text{SQRT}(vx^*vx + vy^*vy) \quad (4)$

In equation (4), vx represents a horizontal component of the motion vector #i−1 and vy represents a vertical component of the motion vector #i−1.

Also, the motion amount calculation unit 144 determines a motion amount blend value BlendM by following equation (5) on the basis of the norm value MvNorm and supplies the same to the blend table generation unit 146.

[Mathematical Formula 5]

$\text{Blend}M = 0.0 \text{(when MvNorm} > Th5 \text{ is satisfied)}$ $\text{Blend}M = (Th5 - \text{MvNorm})/(Th5 - Th6) \text{(when } Th6 \leq \text{MvNorm} \leq Th5 \text{ is satisfied)}$ $\text{Blend}M = 1.0 \text{(when MvNorm} > Th6 \text{ is satisfied)} \quad (5)$ In equation (5), Th5 and Th6 represent predetermined thresholds; the threshold Th5 is larger than the threshold Th6.

The weight table generation unit 145 reads the motion vector #i−1 from the frame memory 82. The weight table generation unit 145 generates a weight table indicating a weight for the pair the difference information of which is registered in the SAD table on the basis of the read motion vector #i−1.

Specifically, the weight table generation unit 145 defines a central position (px,py) of the reference image block the vector of which indicating the relative position from the standard image block is the motion vector #i−1 of the standard image block by following equation (6).

[Mathematical Formula 6]

$px = tx + vx$ $px = ty + vy \quad (6)$

In equation (6), tx and ty represent positions in the horizontal direction and in the vertical direction, respectively, of the center of the standard image block. Also, vx represents a horizontal component of the motion vector #i−1 and vy represents a vertical component of the motion vector #i−1.

The weight table generation unit 145 determines a weight w(x,y) for the pair of the reference image block the center of which is located in a position (x,y) in the area to be searched and the standard image block by following equation (7) by using the position (px,py) defined by equation (6) described above.

[Mathematical Formula 7]

$$w(x,y)=1.0-(\text{SQRT}((px-x)*(px-x)+(py-y)*(py-y)*(py-Y))/B\text{size}) \quad (7)$$

In equation (7), Bsize represents a size in the horizontal direction and in the vertical direction of the area to be searched, and according to this, it is possible to normalize the weight w(x,y) within a range from 0.0 to 1.0.

According to equation (7), the weight w(px,py) for the pair of the reference image block the central position of which is the position (px,py) and the standard image block is determined to be one being a maximum value. Also, the weight w(x,y) becomes smaller for the pair of the reference image block the central position (x,y) of which is farther from the position (px,py) and the standard image block.

The weight table generation unit 145 generates the weight table having the same size as that of the SAD table in which the weight w(x,y) for each pair determined in the above-described manner is associated with the vector indicating the relative position of the pair. The weight table generation unit 145 supplies the generated weight table to the blend table generation unit 146.

The blend table generation unit 146 (blend ratio determination unit) determines a blend ratio of the SAD tables for each pair on the basis of the luminance blend value BlendL, the contrast blend value BlendC, the motion amount blend value BlendM, and the weight table which are input. Specifically, the blend table generation unit 146 determines the blend ratio within the range from 0.0 to 1.0 so as to be larger as the luminance blend value BlendL, the contrast blend value BlendC, the motion amount blend value BlendM, and the weight w(x,y) are larger for each pair.

Then, the blend table generation unit 146 generates a blend table having the same size as that of the SAD table in which the blend ratio for each pair is associated with the vector indicating the relative position of the pair and supplies the same to the blending unit 147.

The blending unit 147 (combining unit) combines the SAD tables supplied from the difference detection units 83 and 84 in FIG. 3 on the basis of the blend table supplied from the blend table generation unit 146. Specifically, the blending unit 147 multiplies the blend ratio indicated by the blend table by the difference information registered in the SAD table of the long exposure image from the difference detection unit 84 for each pair. The blending unit 147 also multiplies a value obtained by subtracting the blend ratio indicated by the blend table from one by the difference information registered in the SAD table of the short exposure image from the difference detection unit 83 for each pair.

Then, the blending unit 147 adds the difference information of the long exposure image and the difference information of the short exposure image obtained as a result of multiplication for each pair and registers the same to the combined SAD table. The blending unit 147 supplies the combined SAD table to the selection unit 148.

The selection unit 148 selects the vector corresponding to the minimum difference information out of the pieces of difference information registered in the SAD table supplied from the blending unit 147, thereby detecting the motion vector #i of the standard image block. The selection unit 148 supplies the detected motion vector #i of each standard block to the correction unit 57 in FIG. 1 and supplies the same to the frame memory 82 in FIG. 3.

From above, as the blend ratio is closer to 1.0, the difference information of the long exposure image is preferentially used for detecting the motion vector, and as the blend ratio is closer to 0.0, the difference information of the short exposure image is preferentially used for detecting the motion vector.

As a result, when the luminance is high, the difference information of the short exposure image in which the whiteout is less likely to occur is preferentially used for detecting the motion vector, and when the luminance is low, the difference information of the long exposure image in which the black crushing is less likely to occur is preferentially used for detecting the motion vector. Therefore, the detection accuracy of the motion vector is improved.

Also, when the contrast is high, the difference information of the long exposure image with the better SN ratio is preferentially used for detecting the motion vector, and when the contrast is low, the difference information of the short exposure image which is less likely to be affected by the motion blur is preferentially used for detecting the motion vector. As a result, the detection accuracy of the motion vector is improved.

Furthermore, when the motion amount is small, the difference information of the long exposure image with the better SN ratio is preferentially used for detecting the motion vector, and when the motion amount is large, the difference information of the short exposure image which is less likely to be affected by the motion blur is preferentially used for detecting the motion vector. As a result, the detection accuracy of the motion vector is improved.

Also, when change in the motion vector is small, the difference information of the long exposure image with the better SN ratio is preferentially used for detecting the motion vector, and when the change in the motion vector is large, the difference information of the short exposure image which is less likely to be affected by the motion blur is preferentially used for detecting the motion vector. As a result, the detection accuracy of the motion vector is improved.

Also, since the blend table is determined for each standard image block, an optimal blend table may be generated even when the luminance, the contrast, or the motion vector are different depending on the subject as compared to a case in which this is determined for an entire screen. As a result, the detection accuracy of the motion vector may be improved.

(Configuration Example of Blend Table Generation Unit)

Figure 8:
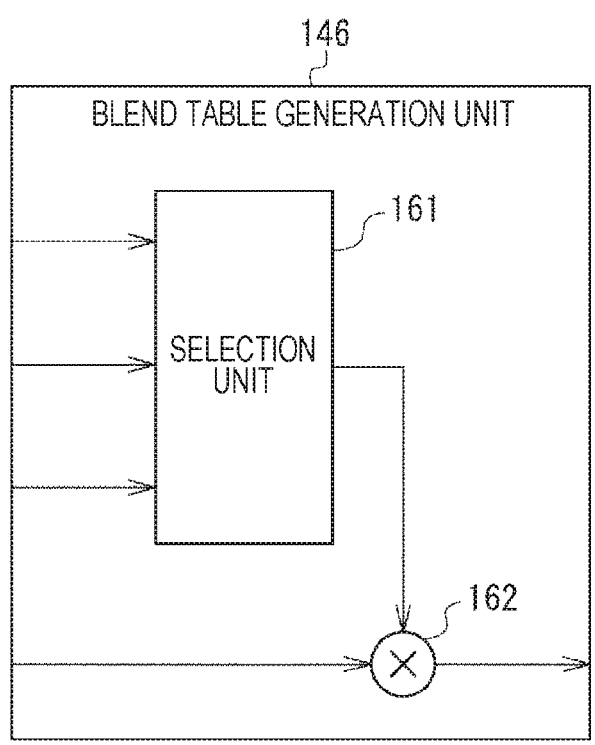
FIG. 8 is a block diagram illustrating a configuration example of a blend table generation unit in FIG. 7.

FIG. 8 is a block diagram illustrating a configuration example of the blend table generation unit 146 in FIG. 7.

The blend table generation unit 146 in FIG. 8 is formed of a selection unit 161 and a multiplication unit 162.

The selection unit 161 of the blend table generation unit 146 selects a minimum value out of the luminance blend value BlendL from the luminance calculation unit 142 in FIG. 7, the contrast blend value BlendC from the contrast calculation unit 143 in FIG. 7, and the motion amount blend value BlendM from the motion amount calculation unit 144 in FIG. 7. The selection unit 161 supplies the selected minimum value to the multiplication unit 162.

The multiplication unit 162 multiplies each weight registered in the weight table supplied from the weight table generation unit 145 by the minimum value supplied from the selection unit 161 to generate the blend table. The multiplication unit 162 supplies the generated blend table to the blending unit 147.

(Description of Process of Digital Camera)

Figure 9:
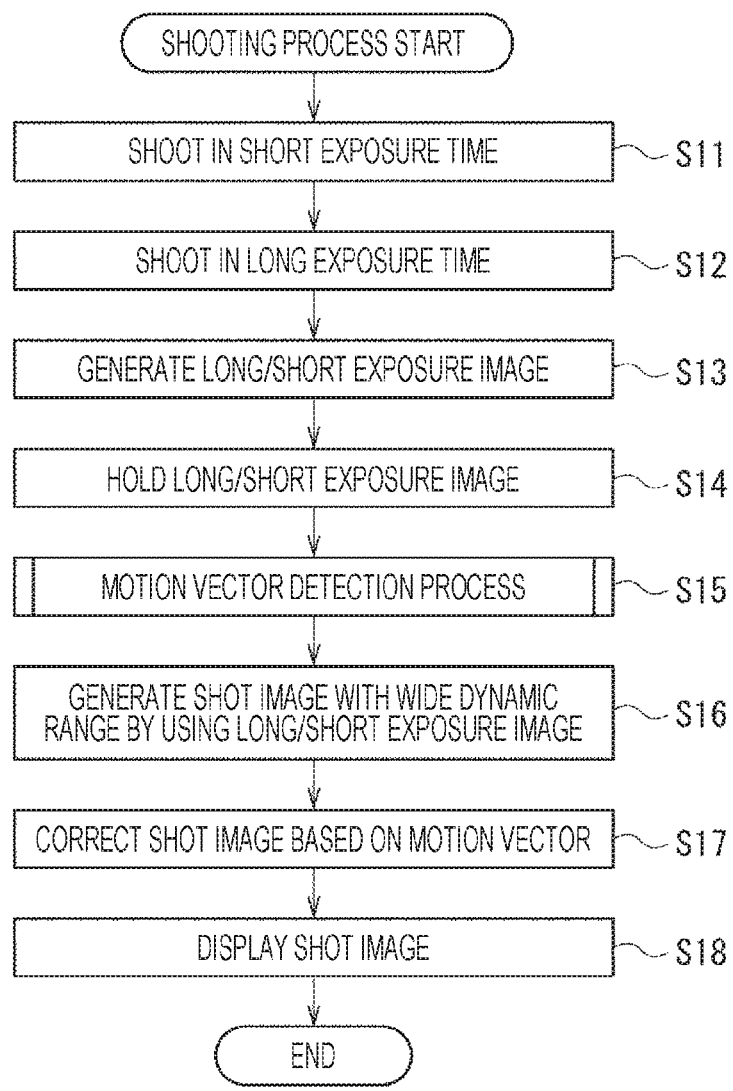
FIG. 9 is a flowchart illustrating a shooting process of the digital camera in FIG. 1.

FIG. 9 is a flowchart illustrating a shooting process of the digital camera 11 in FIG. 1. The shooting process is performed in frame unit, for example.

At step S11 in FIG. 9, the short storage pixel of the image sensor 52 stores the charge according to a light amount of the light incident through the imaging lens 51 and reads the electric signal of the charge stored in the short exposure time as the pixel signal, thereby shooting in the short exposure time. The short storage pixel of the image sensor 52 supplies the pixel signal obtained as a result of the shooting to the camera signal processor 53.

At step S12, the long storage pixel of the image sensor 52 stores the charge according to the light amount of the light incident through the imaging lens 51 and reads the electric signal of the charge stored in the long exposure time as the pixel signal, thereby shooting in the long exposure time. The long storage pixel of the image sensor 52 supplies the pixel signal obtained as a result of the shooting to the camera signal processor 53.

At step S13, the camera signal processor 53 performs the gamma correction processing, the white balance processing, the A/D conversion and the like on the analog image signal formed of the pixel signals of the short storage pixel and the long storage pixel supplied from the image sensor 52, thereby generating the long/short exposure image. Then, the camera signal processor 53 supplies the long/short exposure image to the SDRAM 54.

At step S14, the SDRAM 54 holds the long/short exposure image supplied from the camera signal processor 53.

At step S15, the motion vector detection unit 55 reads the long/short exposure image of the current frame from the SDRAM 54 and performs a motion vector detection process of detecting the motion vector of the current frame on the basis of the long/short exposure image. The motion vector detection process is described in detail with reference to FIG. 10 to be described later.

At step S16, the correction unit 57 reads the long/short exposure image of the current frame from the SDRAM 54 and generates the shot image with the wide dynamic range from the long/short exposure image. At step S17, the correction unit 57 corrects the generated shot image on the basis of the motion vector supplied from the motion vector detection unit 55 and supplies the same to the display control unit 60.

At step S18, the display control unit 60 supplies the shot image supplied from the correction unit 57 to the display unit 61 to display. Then, the procedure ends.

Figure 10:
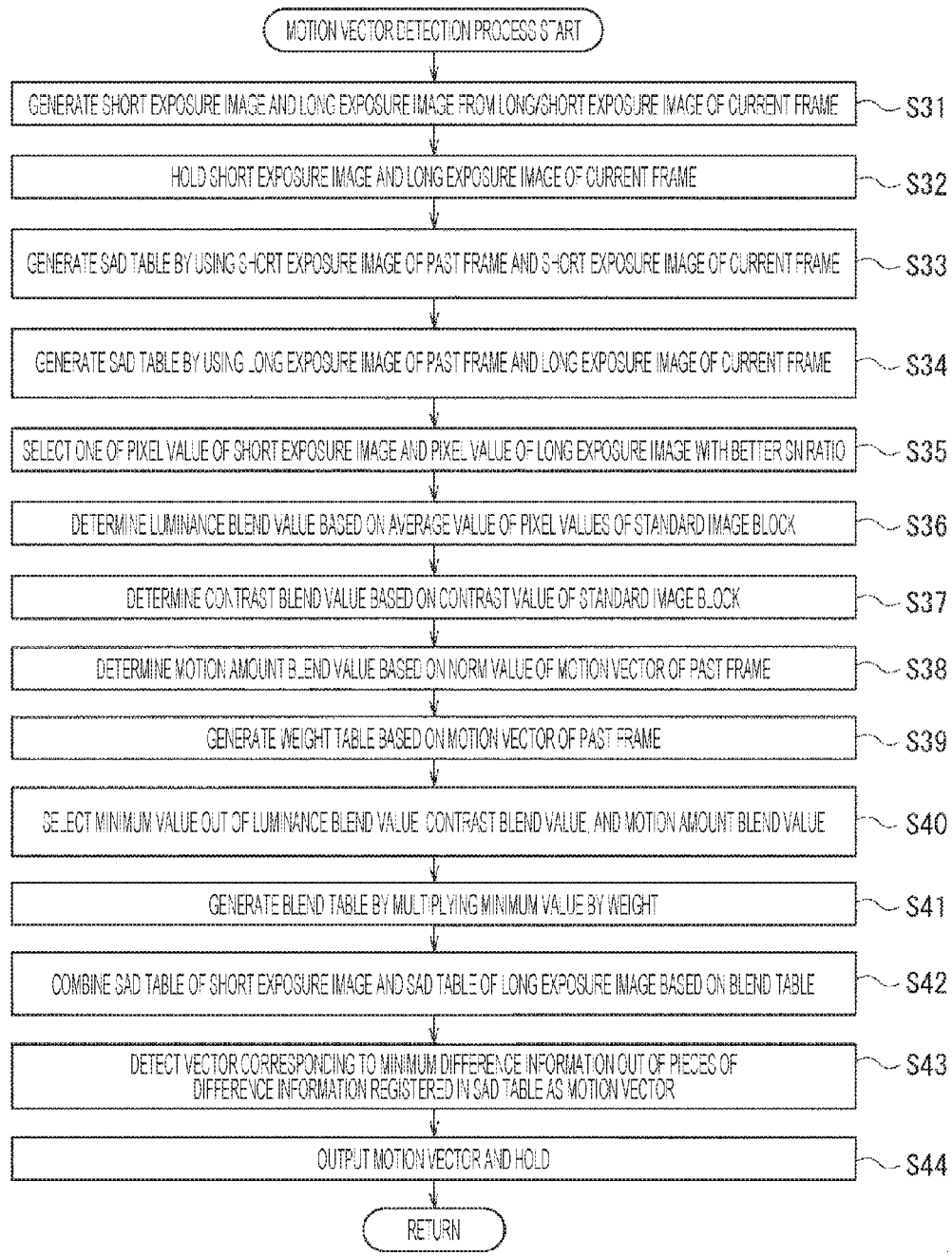
FIG. 10 is a flowchart illustrating a motion vector detection process in FIG. 9 in detail.

FIG. 10 is a flowchart illustrating the motion vector detection process at step S15 in FIG. 9 in detail.

At step S31 in FIG. 10, the separation unit 81 of the motion vector detection unit 55 (FIG. 3) reads the long/short exposure image of the current frame from the SDRAM 54 and separates the long/short exposure image to the pixel value of the short storage pixel and the pixel value of the long storage pixel, thereby generating the short exposure image and the long exposure image. The separation unit 81 supplies the generated short exposure image to the frame memory 82 and the difference detection unit 83 and supplies the long exposure image to the frame memory 82 and the difference detection unit 84.

At step S32, the frame memory 82 holds the short exposure image and the long exposure image of the current frame supplied from the separation unit 81. Processes at subsequent steps S33 to S44 are performed for each standard image block.

At step S33, the difference detection unit 83 generates the SAD table of the current standard image block by using the short exposure image of the past frame held in the frame memory 82 and the short exposure image of the current frame from the separation unit 81. The difference detection unit 83 supplies the current standard image block and the SAD table of the short exposure image to the combining unit 85.

At step S34, the difference detection unit 84 generates the SAD table of the current standard image block by using the long exposure image of the past frame held in the frame memory 82 and the long exposure image of the current frame from the separation unit 81. The difference detection unit 83 supplies the current standard image block and the SAD table of the long exposure image to the combining unit 85.

At step S35, the selection unit 141 of the combining unit 85 (FIG. 7) selects one of the pixel value of the short exposure image supplied from the difference detection unit 83 and the pixel value of the long exposure image supplied from the difference detection unit 84 with the better SN ratio for each pixel of the current standard image block. The selection unit 141 supplies the selected pixel value of each pixel of the standard image block to the luminance calculation unit 142 and the contrast calculation unit 143.

At step S36, the luminance calculation unit 142 obtains the average value BlockAve of the pixel values of the current standard image block supplied from the selection unit 141 and determines the luminance blend value BlendL by equation (1) described above on the basis of the average value BlockAve. The luminance calculation unit 142 supplies the luminance blend value BlendL to the blend table generation unit 146.

At step S37, the contrast calculation unit 143 determines the contrast blend value BlendC by equation (3) described above on the basis of the contrast value BlockCont of the current standard image block. Meanwhile, the contrast value BlockCont of the current standard image block is obtained by equation (2) described above on the basis of the pixel values of the current standard image block supplied from the selection unit 141. The contrast calculation unit 143 supplies the contrast blend value BlendC to the blend table generation unit 146.

At step S38, the motion amount calculation unit 144 determines the motion amount blend value BlendM by equation (5) described above on the basis of the norm value MvNorm of the motion vector of the past frame. Meanwhile, the norm value MvNorm of the motion vector of the past frame is obtained by equation (4) described above on the basis of the motion vector of the past frame held in the frame memory 82. The motion amount calculation unit 144 supplies the motion amount blend value BlendM to the blend table generation unit 146.

At step S39, the weight table generation unit 145 reads the motion vector of the past frame from the frame memory 82 and generates the weight table on the basis of the motion vector. The weight table generation unit 145 supplies the generated weight table to the blend table generation unit 146.

At step S40, the selection unit 161 of the blend table generation unit 146 (FIG. 8) selects the minimum value out of the luminance blend value BlendL, the contrast blend value BlendC, and the motion amount blend value BlendM which are input. The selection unit 161 supplies the selected minimum value to the multiplication unit 162.

At step S41, the multiplication unit 162 multiplies each weight registered in the weight table supplied from the weight table generation unit 145 by the minimum value supplied from the selection unit 161 to generate the blend table. The multiplication unit 162 supplies the generated blend table to the blending unit 147.

At step S42, the blending unit 147 combines the SAD table of the short exposure image supplied from the difference detection unit 83 and the SAD table of the long exposure image supplied from the difference detection unit 84 on the basis of the blend table supplied from the blend table generation unit 146. The blending unit 147 supplies the combined SAD table to the selection unit 148.

At step S43, the selection unit 148 detects the vector corresponding to the minimum difference information out of the pieces of difference information registered in the SAD table supplied from the blending unit 147 as the motion vector of the current standard image block.

At step S44, the selection unit 148 outputs the detected motion vector to the correction unit 57 and supplies the same to the frame memory 82 to hold. The motion vector is used as the motion vector of the past frame in the processes at steps S38 and S39 when a next frame of the current frame at present is newly made the current frame. After the process at step S44, the procedure returns to step S15 in FIG. 9 and shifts to step S16.

As described above, the digital camera 11 generates the SAD table of the short exposure image and the SAD table of the long exposure image and combines the SAD table of the short exposure image and the SAD table of the long exposure image on the basis of the short exposure image or the long exposure image. Then, the digital camera 11 detects the motion vector on the basis of the combined SAD table.

Therefore, it is possible to detect the motion vector by preferentially using one of the SAD table of the short exposure image and the SAD table of the long exposure image suitable for the luminance and contrast of the short exposure image or the long exposure image. As a result, the detection accuracy of the motion vector is improved.

Second Embodiment (Configuration Example of Second Embodiment of Digital Camera)

Figure 11:
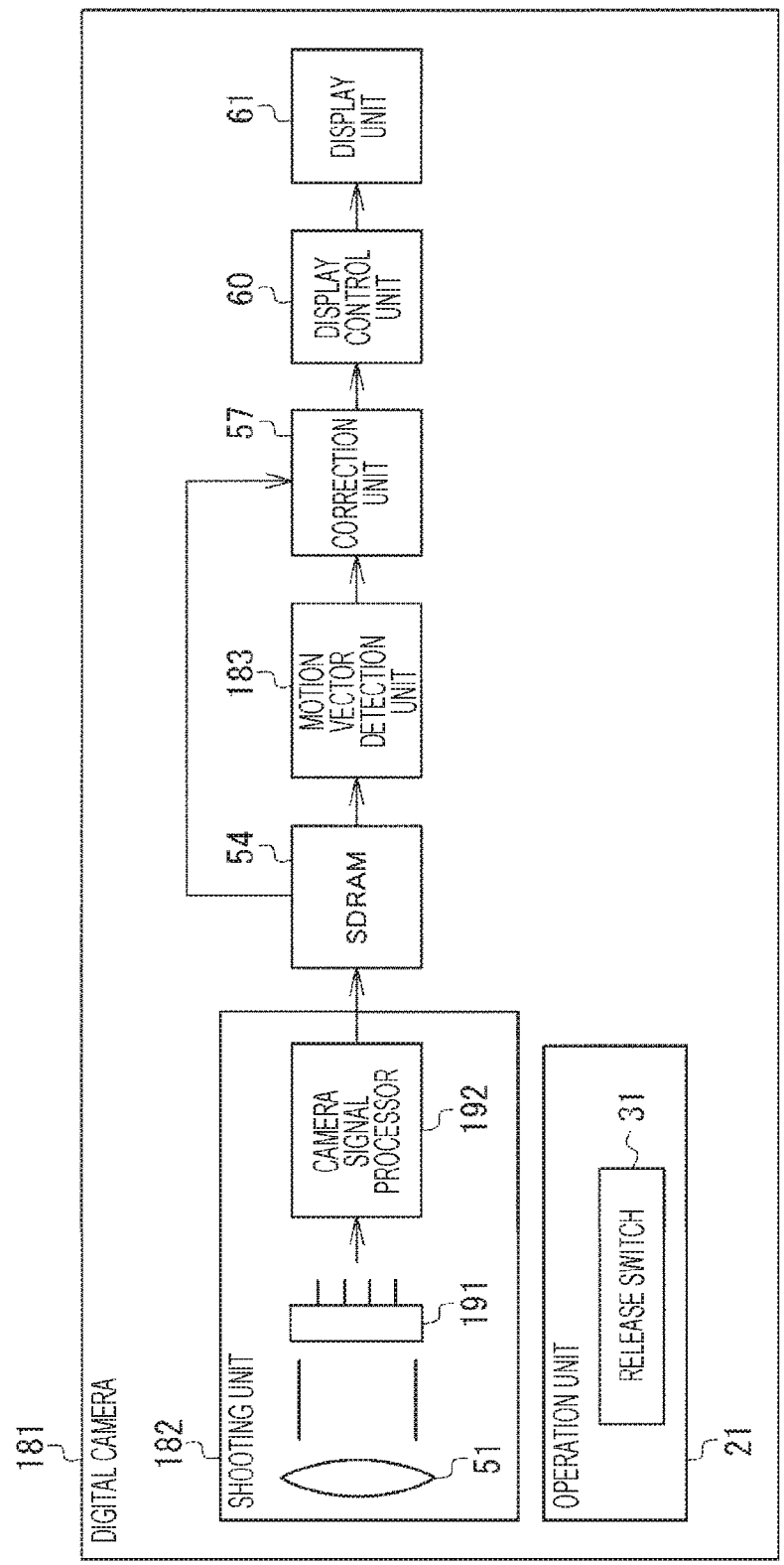
FIG. 11 is a block diagram illustrating a configuration example of a second embodiment of a digital camera as a solid-state imaging device to which the present disclosure is applied.

FIG. 11 is a block diagram illustrating a configuration example of a second embodiment of a digital camera as a solid-state imaging device to which the present disclosure is applied.

In the configuration illustrated in FIG. 11, the same reference sign is assigned to the same configuration as the configuration in FIG. 1. Overlapping description is appropriately omitted.

A configuration of a digital camera 181 in FIG. 11 is different from a configuration of a digital camera 11 in FIG. 1 in that a shooting unit 182 and a motion vector detection unit 183 are provided in place of a shooting unit 41 and a motion vector detection unit 55, respectively. The digital camera 181 shoots in a middle exposure time longer than a short exposure time and shorter than a long exposure time in addition to the short exposure time and long exposure time.

The shooting unit 182 is formed of an imaging lens 51, an image sensor 191, and a camera signal processor 192.

The image sensor 191 is formed of a CCD sensor, a CMOS sensor and the like, for example. The image sensor 191 performs photoelectric conversion on an image (light) of a subject formed on a light receiving surface thereof through the imaging lens 51 in pixel unit and stores a charge obtained as a result.

Herein, the exposure time of a part of pixels of the image sensor 191 is the short exposure time, the exposure time of a part of other pixels is the middle exposure time, and the exposure time of the remaining pixels is the long storage exposure time. The image sensor 191 reads an electric signal of the charge stored in the short exposure time in a short storage pixel as a pixel signal, thereby shooting in the short exposure time for each frame.

The image sensor 191 also reads the electric signal of the charge stored in the middle exposure time in the pixel the exposure time of which is the middle exposure time (hereinafter, referred to as a middle storage pixel) as the pixel signal, thereby shooting in the middle exposure time for each frame.

Furthermore, the image sensor 191 reads the electric signal of the charge stored in the long exposure time in the long storage pixel as the pixel signal, thereby shooting in the long exposure time for each frame. The image sensor 191 supplies the pixel signals of the short storage pixel, the middle storage pixel, and the long storage pixel in frame unit read as a result of shooting to the camera signal processor 192 as an image signal.

The camera signal processor 192 performs gamma correction processing, white balance processing and the like, for example, on an analog image signal supplied from the image sensor 191. The camera signal processor 192 performs A/D conversion on the analog image signal obtained as a result to generate a digital image signal and supplies the image signal to an SDRAM 54 as a long/middle/short exposure image in frame unit.

The motion vector detection unit 183 (image processing device) reads the long/middle/short exposure image of a current frame from the SDRAM 54. The motion vector detection unit 183 detects a motion vector of the current frame on the basis of the long/middle/short exposure image of the current frame read from the SDRAM 54. The motion vector detection unit 183 supplies the detected motion vector to a correction unit 57.

(Configuration Example of Motion Vector Detection Unit)

Figure 12:
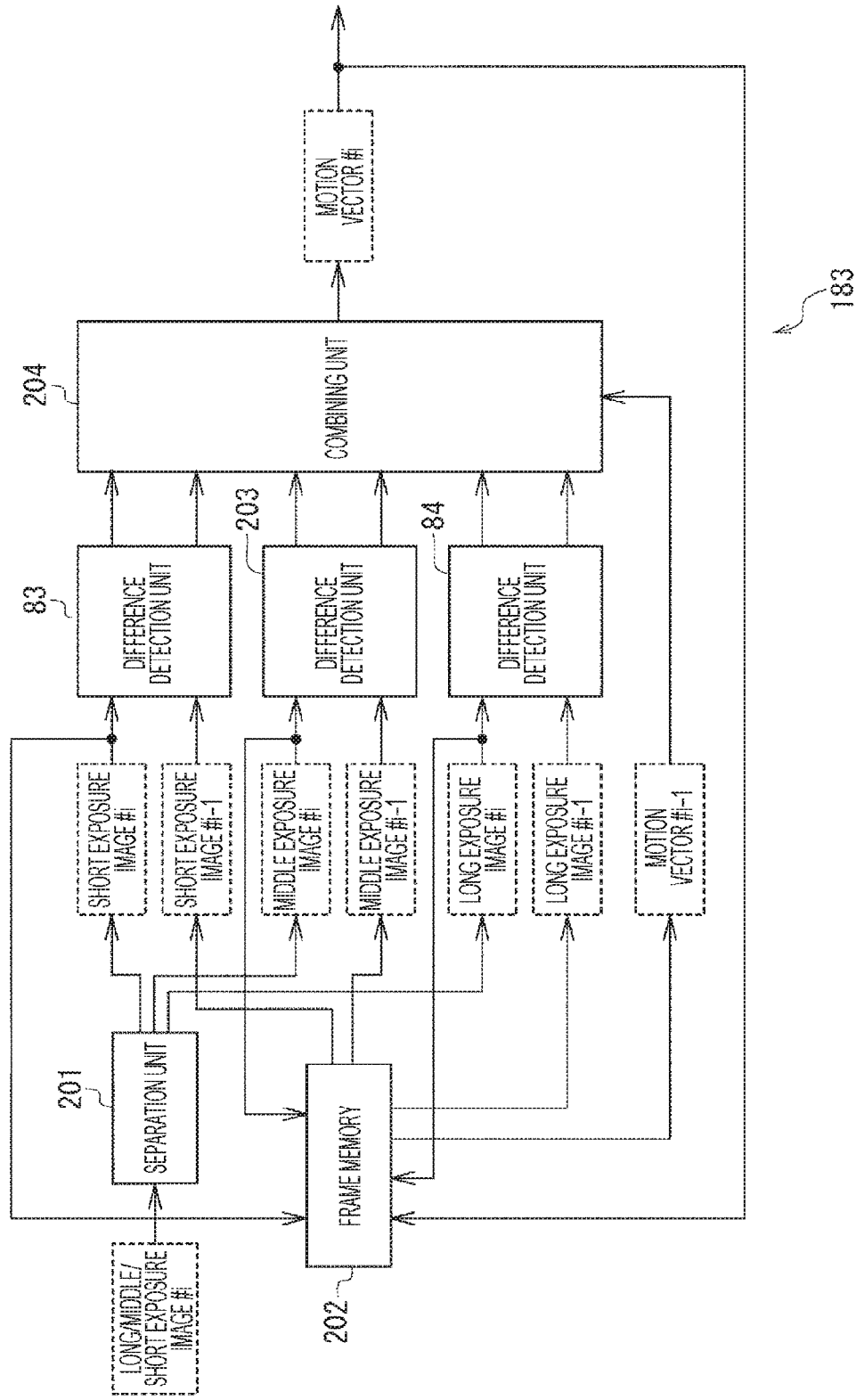
FIG. 12 is a block diagram illustrating a configuration example of a motion vector detection unit in FIG. 11.

FIG. 12 is a block diagram illustrating a configuration example of the motion vector detection unit 183 in FIG. 11.

In the configuration illustrated in FIG. 12, the same reference sign is assigned to the same configuration as the configuration in FIG. 3. Overlapping description is appropriately omitted.

The configuration of the motion vector detection unit 183 in FIG. 12 is different from a configuration of the motion vector detection unit 55 in FIG. 3 in that a separation unit 201, a frame memory 202, and a combining unit 204 are provided in place of a separation unit 81, a frame memory 82, and a combining unit 85, respectively, and that a difference detection unit 203 is newly provided.

The separation unit 201 of the motion vector detection unit 183 makes an ith frame the current frame and reads a long/middle/short exposure image #i being the long/middle/short exposure image of the ith frame from the SDRAM 54. The separation unit 201 separates a pixel value of the short storage pixel, a pixel value of the middle storage pixel, and a pixel value of the long storage pixel from the read long/middle/short exposure image #i.

The separation unit 201 supplies a short exposure image #i formed of the separated pixel value of the short storage pixel to the frame memory 202 and a difference detection unit 83. The separation unit 201 also supplies a middle exposure image #i formed of the separated pixel value of the middle storage pixel to the frame memory 202 and the difference detection unit 203. The separation unit 201 supplies a long exposure image #i formed of the separated pixel value of the long storage pixel to the frame memory 202 and a difference detection unit 84.

Meanwhile, the separation unit 201 herein generates the short exposure image #i by using the separated pixel value of the short storage pixel as-is, so that resolution of the short exposure image #i is lower than that of the long/middle/short exposure image #i. That is to say, there is no pixel value in positions of the middle storage pixel and the long storage pixel in the short exposure image #i, so that the resolution of the short exposure image #i is lower than that of the long/middle/short exposure image #i.

The separation unit 201 may also generate the short exposure image #i having the same resolution as that of the long/middle/short exposure image #i by performing bi-linear interpolation and the like on the pixel values in the positions of the middle storage pixel and the long storage pixel by using the pixel value of the short storage pixel around the same. This is similar for the middle exposure image #i and the long exposure image #i.

The frame memory 202 holds a short exposure image #i−1, a long exposure image #i−1, and a middle exposure image #i−1 of an (i−1)th frame supplied from the separation unit 201 when the (i−1)th frame is made the current frame. The frame memory 202 also holds a motion vector #i−1 supplied from the combining unit 204 when the (i−1)th frame is made the current frame.

The frame memory 202 also holds the short exposure image #i, the middle exposure image #i, and the long exposure image #i supplied from the separation unit 201. The short exposure image #i, the middle exposure image #i, and the long exposure image #i are read to be used when the current frame is an (i+1)th frame.

The difference detection unit 203 reads the middle exposure image #i−1 of the (i−1)th frame being the past frame from the frame memory 202. The difference detection unit 203 generates a SAD table for each standard image block according to a block matching method as is the case with the difference detection unit 83 by using the read middle exposure image #i−1 and the middle exposure image #i supplied from the separation unit 201. The difference detection unit 203 supplies the standard image block and the SAD table to the combining unit 204 for each standard image block.

The combining unit 204 reads the motion vector #i−1 from the frame memory 202. The combining unit 204 combines the SAD tables supplied from the difference detection units 83, 84, and 203 on the basis of the standard image blocks supplied from the difference detection units 83, 84, and 203 and the motion vector #i−1 for each standard image block.

The combining unit 204 detects a vector corresponding to minimum difference information as a motion vector #i of the current frame on the basis of the combined SAD table for each standard image block. The combining unit 204 supplies the generated motion vector #i to the correction unit 57 in FIG. 11 and supplies the same to the frame memory 202 to hold. The motion vector #i held in the frame memory 202 is read to be used as the motion vector of the past frame when the current frame is the (i+1)th frame.

(Configuration Example of Combining Unit)

Figure 13:
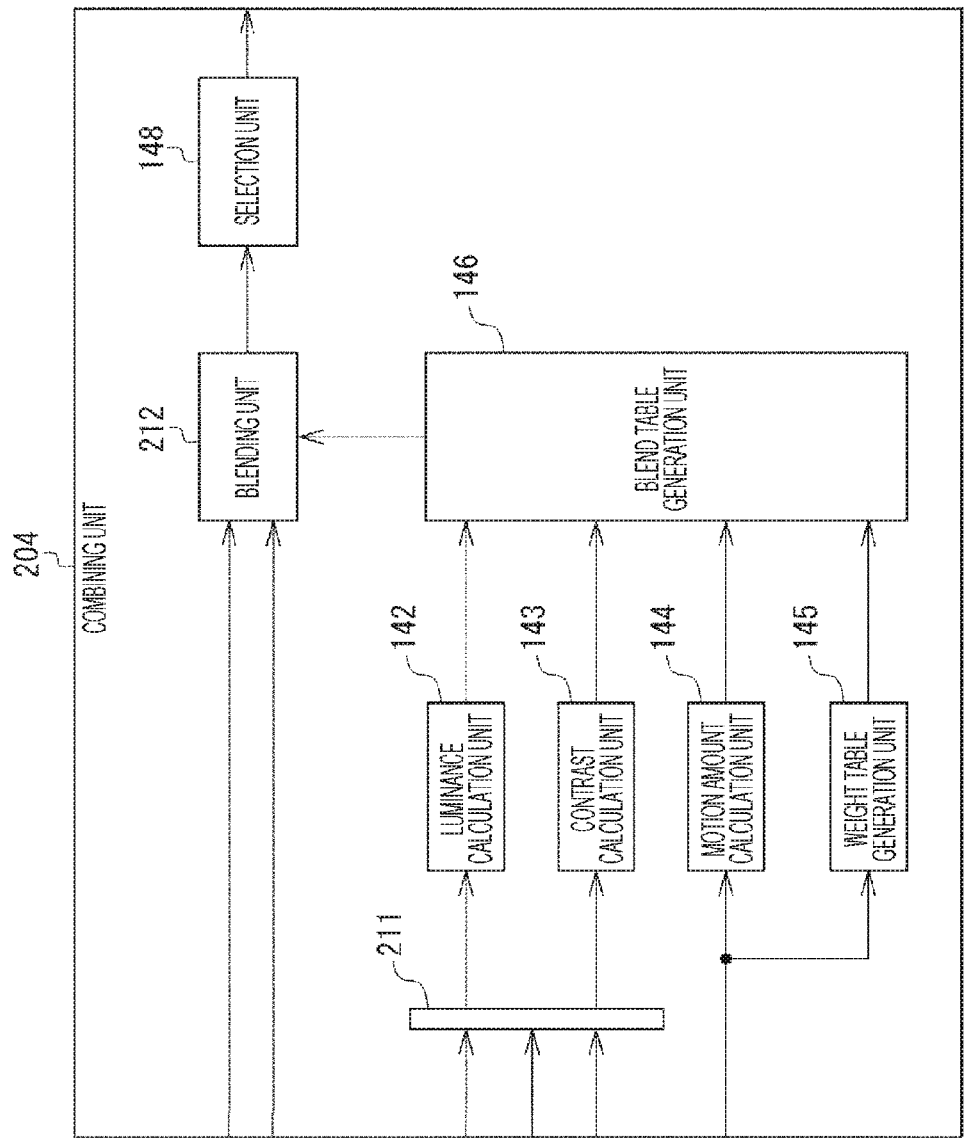
FIG. 13 is a block diagram illustrating a configuration example of a combining unit in FIG. 12.

FIG. 13 is a block diagram illustrating a configuration example of the combining unit 204 in FIG. 12.

In the configuration illustrated in FIG. 13, the same reference sign is assigned to the same configuration as the configuration in FIG. 7. Overlapping description is appropriately omitted.

The configuration of the combining unit 204 in FIG. 13 is different from that of the combining unit 85 in FIG. 7 in that a selection unit 211 and a blending unit 212 are provided in place of a selection unit 141 and a blending unit 147, respectively.

The selection unit 211 of the combining unit 204 selects one of the pixel value of the short exposure image #i from the difference detection unit 83 in FIG. 12, the pixel value of the middle exposure image #i from the difference detection unit 203 in FIG. 12, and the pixel value of the long exposure image #i from the difference detection unit 84 in FIG. 12 with a best SN ratio for each pixel of the standard image block.

That is to say, the SN ratios of the short exposure image, the middle exposure image, and the long exposure image are determined in advance for the pixel value of each of them. Therefore, the selection unit 211 compares the SN ratio based on the pixel value of the short exposure image #i, the SN ratio based on the pixel value of the middle exposure image #i, and the SN ratio based on the pixel value of the long exposure image #i to select one with the best SN ratio for each pixel of the standard image block. The selection unit 211 supplies the selected pixel value of each pixel of the standard image block to a luminance calculation unit 142 and a contrast calculation unit 143.

The blending unit 212 combines the SAD tables supplied from the difference detection units 83, 203, and 84 in FIG. 12 on the basis of a blend table supplied from a blend table generation unit 146. Specifically, when a blend ratio indicated by the blend table is not smaller than 0 and not larger than 0.5, the blending unit 212 multiplies the blend ratio by the difference information registered in the SAD table of the middle exposure image from the difference detection unit 203 for each pair. The blending unit 212 also multiplies a value obtained by subtracting the blend ratio indicated by the blend table from one by the difference information registered in the SAD table of the short exposure image from the difference detection unit 83 for each pair. Then, the blending unit 212 adds the difference information of the middle exposure image and the difference information of the short exposure image obtained as a result of multiplication for each pair and registers the same to the combined SAD table.

On the other hand, when the blend ratio indicated by the blend table is larger than 0.5 and not larger than one, the blend ratio is multiplied by the difference information registered in the SAD table of the long exposure image from the difference detection unit 84. Also, the blending unit 212 multiplies a value obtained by subtracting the blend ratio indicated by the blend table from one by the difference information registered in the SAD table of the middle exposure image from the difference detection unit 203 for each pair. Then, the blending unit 212 adds the difference information of the long exposure image and the difference information of the middle exposure image obtained as a result of the multiplication for each pair and registers the same to the combined SAD table. The blending unit 212 supplies the combined SAD table to a selection unit 148.

(Description of Process of Digital Camera)

Figure 14:
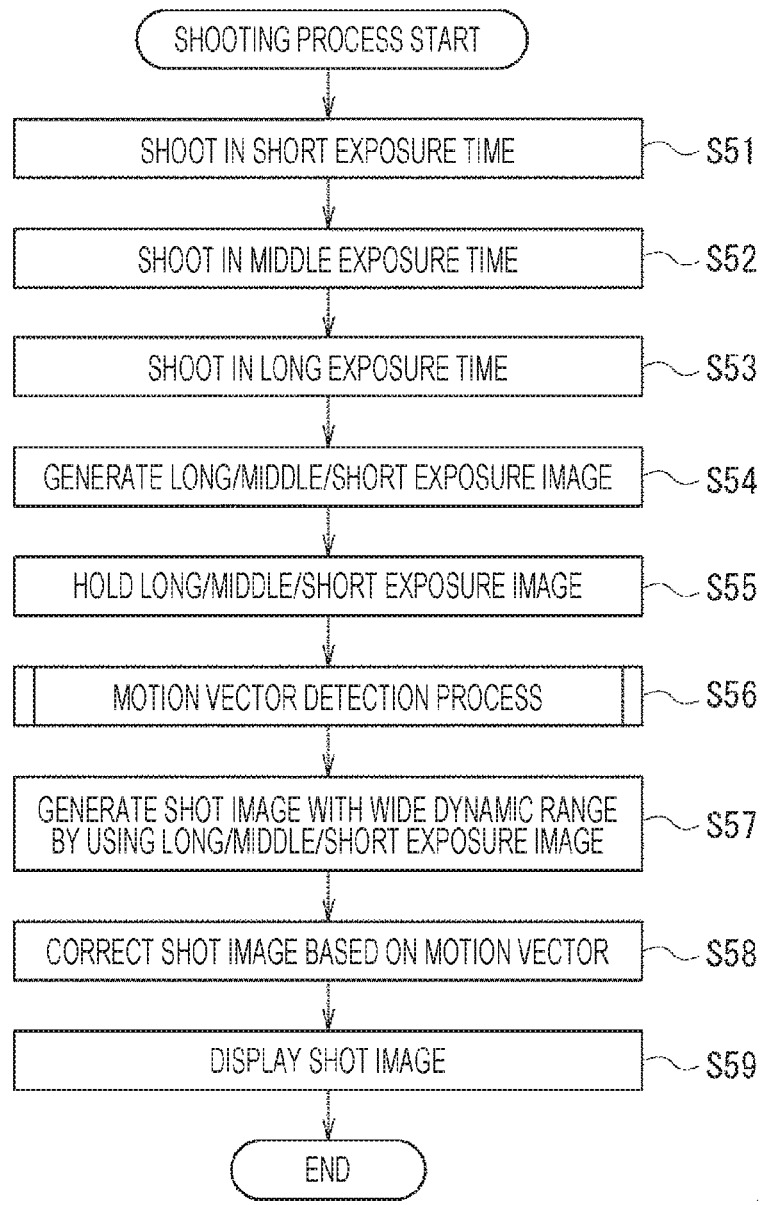
FIG. 14 is a flowchart illustrating a shooting process of the digital camera in FIG. 11.

FIG. 14 is a flowchart illustrating a shooting process of the digital camera 181 in FIG. 11. The shooting process is performed in frame unit, for example.

At step S51 in FIG. 14, the short storage pixel of the image sensor 191 stores the charge according to a light amount of the light incident through the imaging lens 51 and reads the electric signal of the charge stored in the short exposure time as the pixel signal, thereby shooting in the short exposure time. The image sensor 191 supplies the pixel signal obtained as a result of the shooting to the camera signal processor 192.

At step S52, the middle storage pixel of the image sensor 191 stores the charge according to the light amount of the light incident through the imaging lens 51 and reads the electric signal of the charge stored in the middle exposure time as the pixel signal, thereby shooting in the middle exposure time. The image sensor 191 supplies the pixel signal obtained as a result of the shooting to the camera signal processor 192.

At step S53, the long storage pixel of the image sensor 191 stores the charge according to the light amount of the light incident through the imaging lens 51 and reads the electric signal of the charge stored in the long exposure time as the pixel signal, thereby shooting in the long exposure time. The image sensor 191 supplies the pixel signal obtained as a result of the shooting to the camera signal processor 192.

At step S54, the camera signal processor 192 performs the gamma correction processing, the white balance processing, the A/D conversion and the like on the analog image signal formed of the pixel signals of the short storage pixel, the middle storage pixel, and the long storage pixel supplied from the image sensor 191, thereby generating the long/middle/short exposure image. Then, the camera signal processor 192 supplies the long/middle/short exposure image to the SDRAM 54.

At step S55, the SDRAM 54 stores the long/middle/short exposure image supplied from the camera signal processor 192.

At step S56, the motion vector detection unit 183 reads the long/middle/short exposure image of the current frame from the SDRAM 54 and performs a motion vector detection process of detecting the motion vector of the current frame on the basis of the long/middle/short exposure image. The motion vector detection process is described in detail with reference to FIG. 15 to be described later.

At step S57, the correction unit 57 reads the long/middle/short exposure image of the current frame from the SDRAM 54 and generates a shot image with a wide dynamic range from the long/middle/short exposure image. Processes at steps S58 and S59 are similar to processes at steps S17 and S18 in FIG. 9, so that description thereof is omitted.

Figure 15:
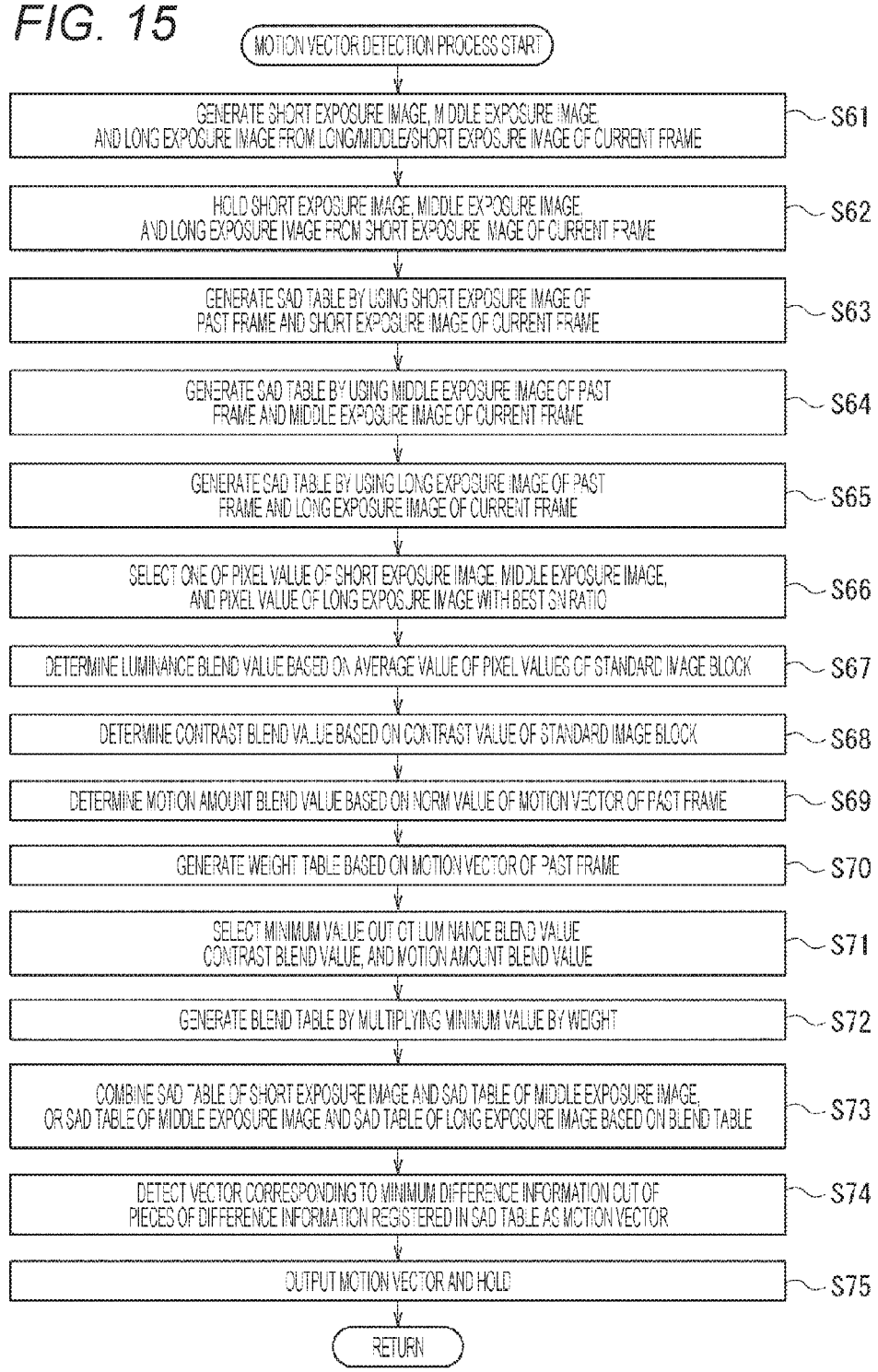
FIG. 15 is a flowchart illustrating a motion vector detection process in FIG. 14 in detail.

FIG. 15 is a flowchart illustrating the motion vector detection process at step S56 in FIG. 14 in detail.

At step S61 in FIG. 15, the separation unit 201 of the motion vector detection unit 183 (FIG. 12) separates the long/middle/short exposure image of the current frame held in the SDRAM 54, thereby generating the short exposure image, the middle exposure image, and the long exposure image. The separation unit 201 supplies the generated short exposure image to the frame memory 202 and the difference detection unit 83, supplies the middle exposure image to the frame memory 202 and the difference detection unit 203, and supplies the long exposure image to the frame memory 202 and the difference detection unit 84.

At step S62, the frame memory 202 holds the short exposure image, the middle exposure image, and the long exposure image of the current frame supplied from the separation unit 201. Processes at subsequent steps S63 to S75 are performed for each standard image block.

At step S63, the difference detection unit 83 generates the SAD table of the current standard image block by using the short exposure image of the past frame held in the frame memory 202 and the short exposure image of the current frame from the separation unit 201. The difference detection unit 83 supplies the current standard image block and the SAD table of the short exposure image to the combining unit 204.

At step S64, the difference detection unit 203 generates the SAD table of the current standard image block by using the middle exposure image of the past frame held in the frame memory 202 and the middle exposure image of the current frame from the separation unit 201. The difference detection unit 203 supplies the current standard image block and the SAD table of the middle exposure image to the combining unit 204.

At step S65, the difference detection unit 84 generates the SAD table of the current standard image block by using the long exposure image of the past frame held in the frame memory 202 and the long exposure image of the current frame from the separation unit 201. The difference detection unit 83 supplies the current standard image block and the SAD table of the long exposure image to the combining unit 204.

At step S66, the selection unit 211 of the combining unit 204 (FIG. 13) selects one of the pixel value of the short exposure image, the pixel value of the middle exposure image, and the pixel value of the long exposure image with the best SN ratio for each pixel of the current standard image block. The selection unit 211 supplies the selected pixel value of each pixel of the standard image block to the luminance calculation unit 142 and the contrast calculation unit 143.

Processes at steps S67 to S72 are similar to processes at steps S36 to S41 in FIG. 10, so that description thereof is omitted.

At step S73, the blending unit 212 combines the SAD table of the short exposure image and the SAD table of the middle exposure image or the SAD table of the middle exposure image and the SAD table of the long exposure image on the basis of the blend table supplied from the blend table generation unit 146. The blending unit 212 supplies the combined SAD table to a selection unit 148.

Processes at steps S74 and S75 are similar to processes at steps S43 and S44 in FIG. 10, so that description thereof is omitted.

As described above, the digital camera 181 generates the SAD of the short exposure image, the middle storage exposure image, and the long exposure image and combines the SAD tables of the short exposure image, the middle storage exposure image, and the long exposure image on the basis of the short exposure image, the middle storage exposure image, or the long exposure image. Then, the digital camera 181 detects the motion vector on the basis of the combined SAD table.

Therefore, it is possible to detect the motion vector by preferentially using the SAD table of a more suitable exposure time, so that detection accuracy of the motion vector is improved.

Third Embodiment (Configuration Example of Third Embodiment of Digital Camera)

A configuration of a third embodiment of a digital camera to which the present disclosure is applied is the same as a configuration of a digital camera 11 in FIG. 1 except a motion vector detection unit 55. Therefore, only a motion vector detection unit is hereinafter described.

Figure 16:
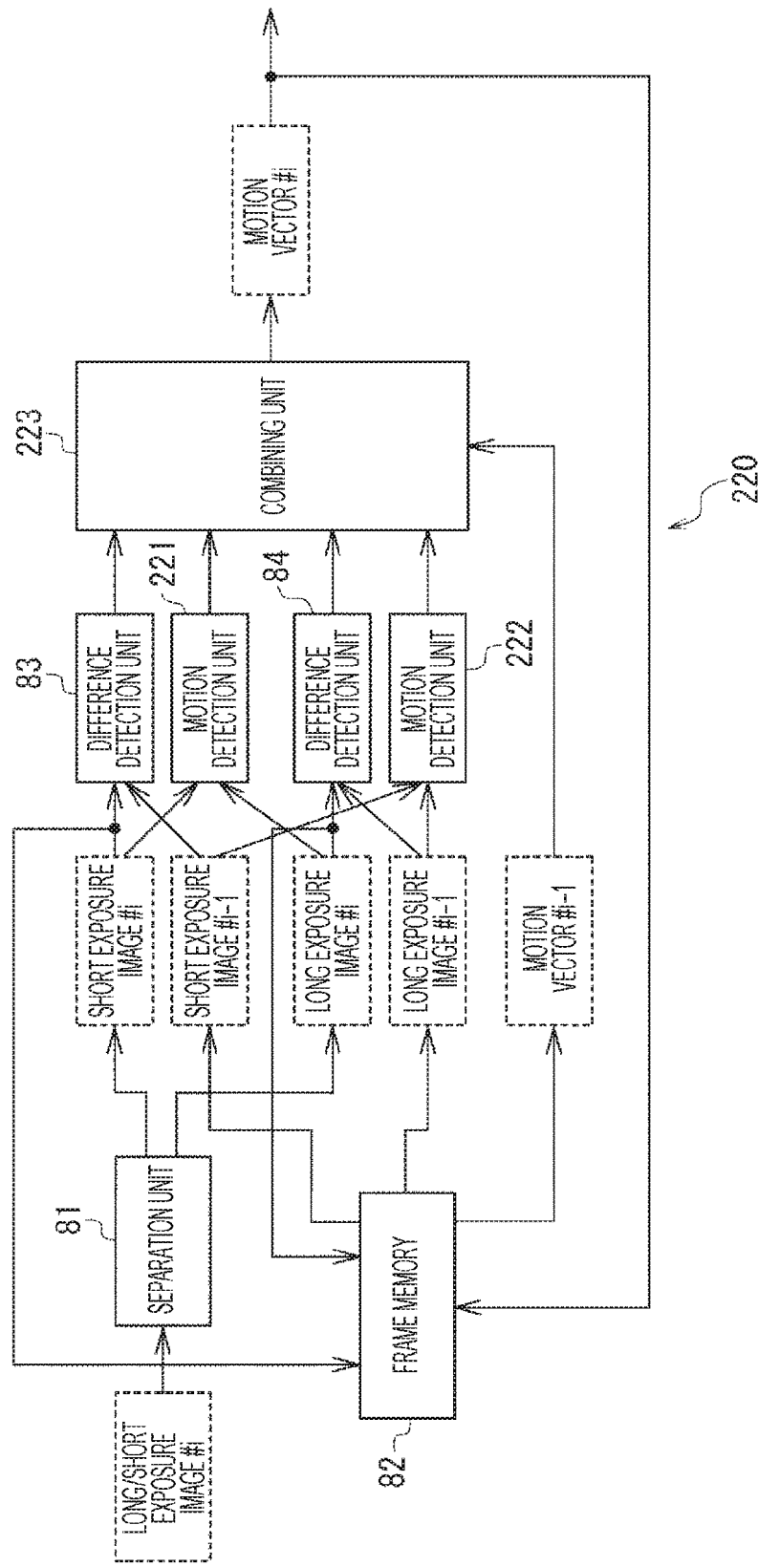
FIG. 16 is a block diagram illustrating a configuration example of a motion vector detection unit in a third embodiment of a digital camera to which the present disclosure is applied.

FIG. 16 is a block diagram illustrating a configuration example of the motion vector detection unit of the third embodiment of the digital camera to which the present disclosure is applied.

In the configuration illustrated in FIG. 16, the same reference sign is assigned to the same configuration as the configuration in FIG. 3. Overlapping description is appropriately omitted.

A configuration of a motion vector detection unit 220 in FIG. 16 is different from the configuration of the motion vector detection unit 55 in FIG. 3 in that motion detection units 221 and 222 are newly provided and that a combining unit 223 is provided in place of a combining unit 85. The motion vector detection unit 220 detects a motion vector on the basis of not only a SAD table of difference information between short exposure images and between long exposure images of different frames but also the motion vector based on the short exposure image and the long exposure image of the same frame.

Specifically, the motion detection unit 221 (first motion detection unit) of the motion vector detection unit 220 (image processing device) detects a temporary motion vector #i of an ith frame according to a method disclosed in Patent Document 1, for example, by using a short exposure image #i and a long exposure image #i supplied from a separation unit 81.

Meanwhile, the method disclosed in Patent Document 1 is the method of detecting the motion vector of the frame supposing that difference between the short exposure image and the long exposure image of the same frame is the difference by an effect of motion due to difference in exposure time. In more detail, the method obtains a motion amount by substituting actual pixel values of the short exposure image and the long exposure image of the pixel into approximate equations representing the long exposure image and the short exposure image of the same pixel with the motion amount as a variable and solving the same as simultaneous equations. The motion detection unit 221 supplies the detected temporary motion vector #i to the combining unit 223.

The motion detection unit 222 (second motion detection unit) reads a short exposure image #i-1 and a long exposure image #i-1 from a frame memory 82. The motion detection unit 222 detects a temporary motion vector #i-1 of an (i-1)th frame according to the method disclosed in Patent Document 1, for example, by using the read short exposure image #i-1 and long exposure image #i-1. The motion detection unit 222 supplies the detected temporary motion vector #i-1 to the combining unit 223.

The combining unit 223 reads a motion vector #i-1 from the frame memory 82. The combining unit 223 combines input SAD tables on the basis of standard image blocks of the short exposure image #i and the long exposure image #i, the temporary motion vectors #i and #i-1, and the motion vector #i-1 which are input for each standard image block.

The combining unit 223 detects the vector corresponding to minimum difference information as the motion vector #i of a current frame on the basis of the combined SAD table for each standard image block. The combining unit 223 supplies the generated motion vector #i to a correction unit 57 in FIG. 1 and supplies the same to the frame memory 82 to hold. The motion vector #i held in the frame memory 82 is read to be used as the motion vector of the past frame when the current frame is the (i+1)th frame.

(Configuration Example of Combining Unit)

Figure 17:
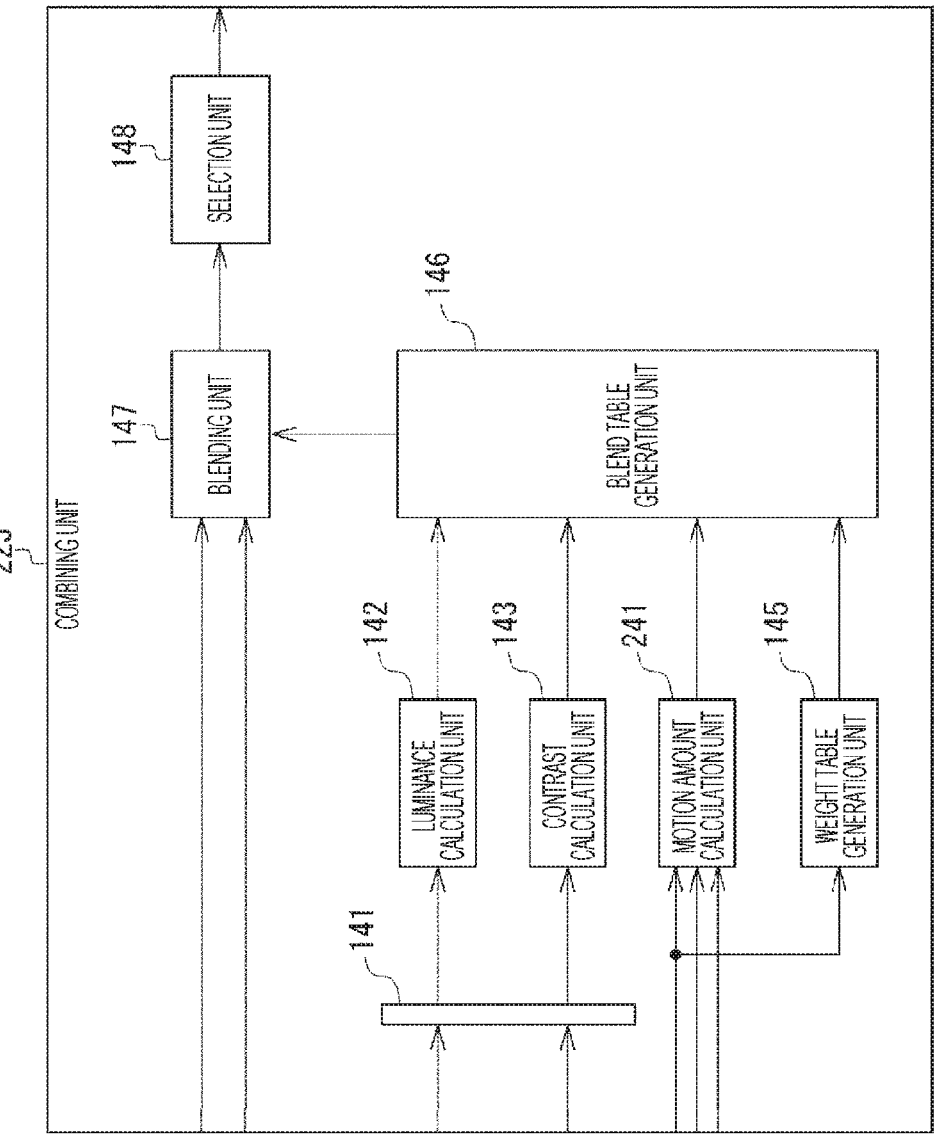
FIG. 17 is a block diagram illustrating a configuration example of a combining unit in FIG. 16.

FIG. 17 is a block diagram illustrating a configuration example of the combining unit 223 in FIG. 16.

In the configuration illustrated in FIG. 17, the same reference sign is assigned to the same configuration as the configuration in FIG. 7. Overlapping description is appropriately omitted.

The configuration of the combining unit 223 in FIG. 17 is different from a configuration of the combining unit 85 in FIG. 7 in that a motion amount calculation unit 241 is provided in place of a motion amount calculation unit 144.

The motion amount calculation unit 241 of the combining unit 223 reads the motion vector #i-1 from the frame memory 82 in FIG. 16. The motion amount calculation unit 241 obtains a norm value MvNorm of the read motion vector #i-1 by equation (4) described above. Similarly, the motion amount calculation unit 241 obtains the norm value MvNorm of each of the temporal motion vector #i supplied from the motion detection unit 221 and the temporal motion vector #i-1 supplied from the motion detection unit 222. Then, the motion amount calculation unit 241 selects a maximum value of the three obtained norm values MvNorm. The motion amount calculation unit 241 determines a motion amount blend value BlendM by equation (5) described above on the basis of the selected norm value MvNorm and supplies the same to a blend table generation unit 146.

Meanwhile, although the motion vector #i-1 is the vector indicating motion between the frames, the temporal motion vectors #i and #i-1 are the vectors indicating the motion within the frame. Therefore, the motion amount calculation unit 241 may determine the motion amount blend value BlendM on the basis of the maximum value of the norm values MvNorm of the motion vector the temporal motion vector and the temporal motion vector thereby generating an optimal blend table even with the image in which the motion between the frames is small but the motion in a short time within the frame is large. As a result, it is possible to detect the motion vector with high accuracy.

(Description of Process of Digital Camera)

A shooting process of the digital camera of the third embodiment is similar to a shooting process in FIG. 9 except a motion vector detection process at step S15 in FIG. 9. Therefore, only the motion vector detection process is hereinafter described.

Figure 18:
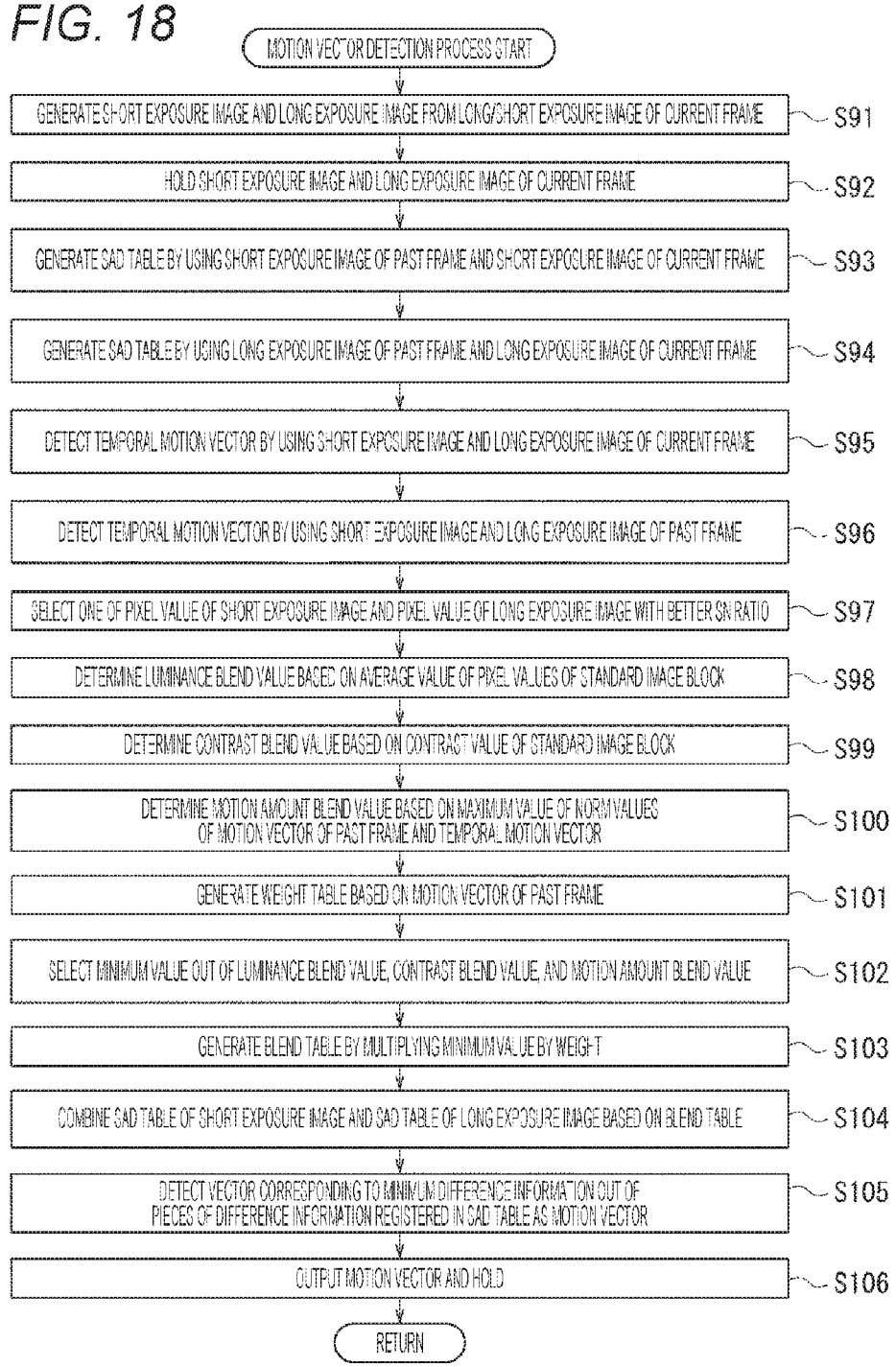
FIG. 18 is a flowchart illustrating a motion vector detection process of the motion vector detection unit in FIG. 16.

FIG. 18 is a flowchart illustrating the motion vector detection process of the motion vector detection unit 220 in FIG. 16.

Processes at steps S91 to S94 in FIG. 18 are similar to processes at steps S31 to S34 in FIG. 10, so that description thereof is omitted.

At step S95, the motion detection unit 221 detects the temporal motion vector of the current frame by using the short exposure image and the long exposure image of the current frame supplied from the separation unit 81 and supplies the same to the combining unit 85.

At step S96, the motion detection unit 222 detects the temporal motion vector of the past frame by using the short exposure image and the long exposure image of the past frame held in the frame memory 82 and supplies the same to the combining unit 85.

Processes at steps S97 to S99 are similar to processes at steps S35 to S37 in FIG. 10, so that description thereof is omitted.

At step S100, the motion amount calculation unit 241 (FIG. 17) determines the motion amount blend value BlendM by equation (5) described above on the basis of the maximum value of the norm values of the motion vector of the past frame, the temporal motion vector of the current frame, and the temporal motion vector of the past frame.

Meanwhile, the motion vector of the past frame is read from the frame memory 82. The motion amount calculation unit 241 supplies the motion amount blend value BlendM to the blend table generation unit 146.

Processes at steps S101 to S106 are similar to processes at step S39 to step S44 in FIG. 10, so that description thereof is omitted.

Fourth Embodiment (Configuration Example of Fourth Embodiment of Digital Camera)

Figure 19:
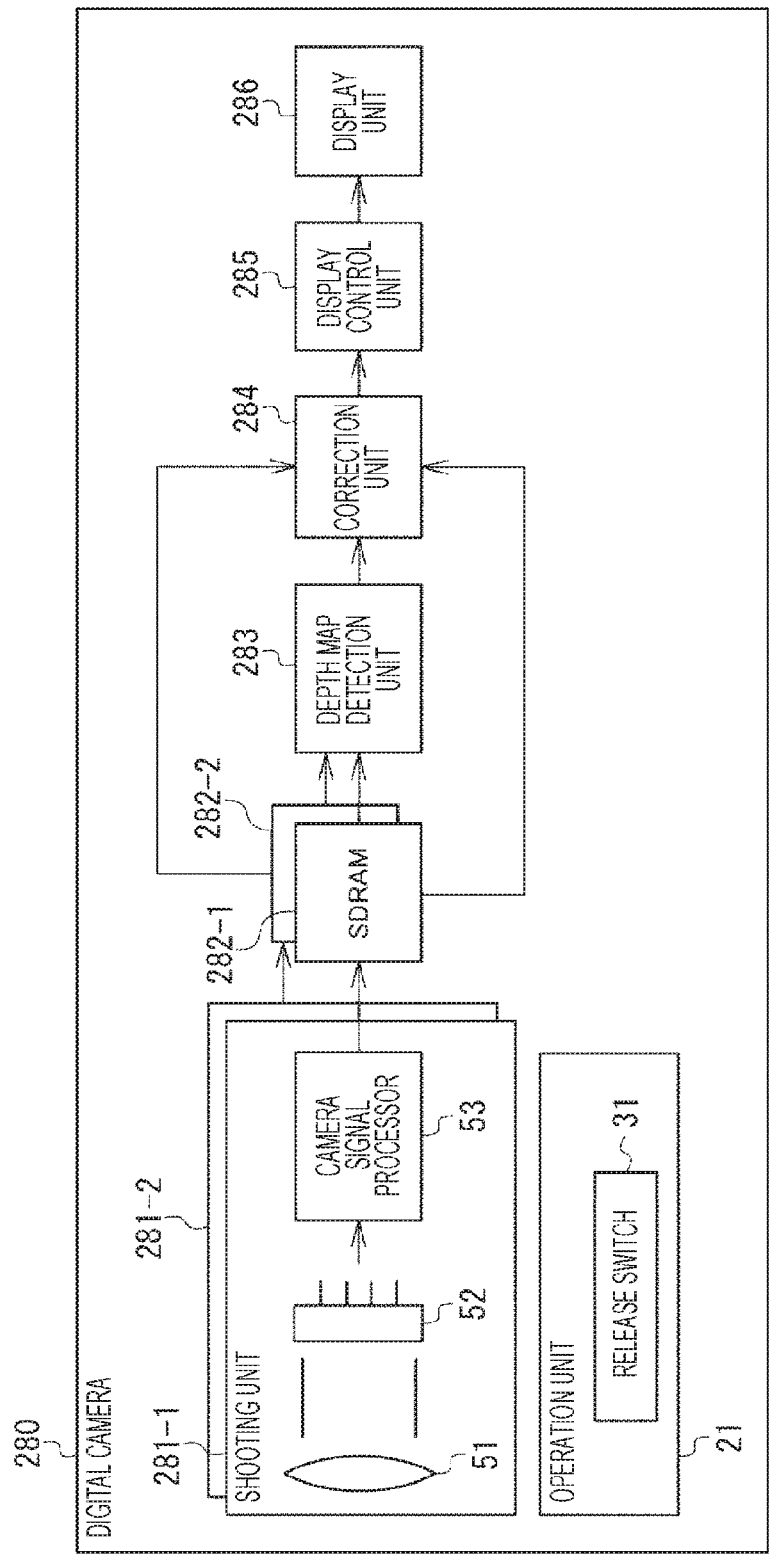
FIG. 19 is a block diagram illustrating a configuration example of a fourth embodiment of a digital camera to which the present disclosure is applied.

FIG. 19 is a block diagram illustrating a configuration example of a fourth embodiment of a digital camera to which the present disclosure is applied.

In the configuration illustrated in FIG. 19, the same reference sign is assigned to the same configuration as the configuration in FIG. 1. Overlapping description is appropriately omitted.

A digital camera 280 in FIG. 19 is formed of an operation unit 21, shooting units 281-1 and 281-2, SDRAMs 282-1 and 282-2, a depth map detection unit 283, a correction unit 284, a display control unit 285, and a display unit 286. The digital camera 280 shoots a three-dimensional image in a short exposure time and long exposure time to generate a depth map.

Specifically, the shooting unit 281-1 formed of an imaging lens 51, an image sensor 52, and a camera signal processor 53 as is the case with a shooting unit 41 shoots a left-eye image in the short exposure time and the long exposure time. The shooting unit 281-1 supplies a left-eye long/short exposure image (hereinafter, referred to as a long/short exposure left image) in frame unit obtained as a result to the SDRAM 282-1.

The shooting unit 281-2 formed of the imaging lens 51, the image sensor 52, and the camera signal processor 53 as is the case with the shooting unit 41 shoots a right-eye image in the short exposure time and the long exposure time. The shooting unit 281-2 supplies a right-eye long/short exposure image (hereinafter, referred to as a long/short exposure right image) obtained as a result to the SDRAM 282-2.

The SDRAM 282-1 stores the long/short exposure left image in frame unit supplied from the shooting unit 281-1. Also, the SDRAM 282-2 stores the long/short exposure right image in frame unit supplied from the shooting unit 281-2.

The depth map detection unit 283 reads the long/short exposure left image of a current frame from the SDRAM 282-1 and reads the long/short exposure right image of the current frame from the SDRAM 282-2. The depth map detection unit 283 detects the depth map of the current frame on the basis of the long/short exposure left image and the long/short exposure right image of the read current frame. The depth map detection unit 283 supplies the detected depth map to the correction unit 284.

The correction unit 284 reads the long/short exposure left image of the current frame from the SDRAM 282-1 and reads the long/short exposure right image of the current frame from the SDRAM 282-2. The correction unit 284 generates a left-eye shot image with a wide dynamic range by using the read long/short exposure left image and generates a right-eye shot image with the wide dynamic range by using the read long/short exposure right image.

The correction unit 284 corrects the left-eye shot image and the right-eye shot image such that depth values of all the pixels fall within a depth value range corresponding to the display unit 286, for example, on the basis of the depth map supplied from the depth map detection unit 283. The correction unit 284 supplies the corrected left-eye shot image and right-eye shot image to the display control unit 285.

The display control unit 285 supplies the left-eye shot image and the right-eye shot image supplied from the correction unit 284 to the display unit 286 and allows the display unit 286 to display the three-dimensional image.

The display unit 286 displays the three-dimensional image and the like according to control of the display control unit 285. A three-dimensional display and the like may be adopted, for example, as the display unit 286.

(Configuration Example of Disparity Detection Unit)

Figure 20:
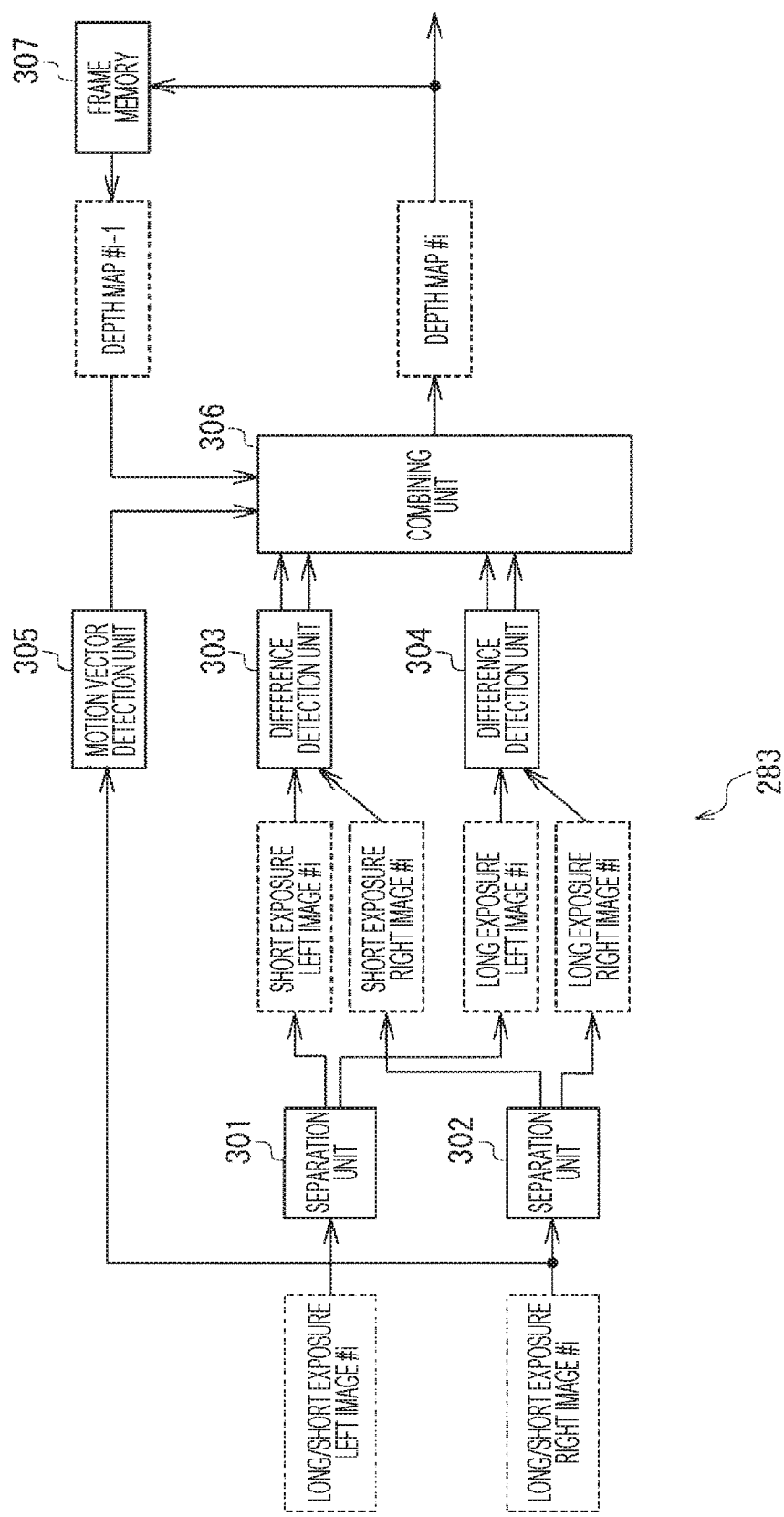
FIG. 20 is a block diagram illustrating a configuration example of a depth map detection unit in FIG. 19.

FIG. 20 is a block diagram illustrating a configuration example of the depth map detection unit 283 in FIG. 19.

The depth map detection unit 283 in FIG. 20 is formed of separation units 301 and 302, difference detection units 303 and 304, a motion vector detection unit 305, a combining unit 306, and a frame memory 307.

The separation unit 301 of the depth map detection unit 283 makes an ith frame the current frame and reads a long/short exposure left image #i being the long/short exposure left image of the ith frame from the SDRAM 282-1. The separation unit 301 separates a pixel value of a short storage pixel and a pixel value of a long storage pixel from the read long/short exposure left image #i and generates a short exposure left image #i formed of the pixel value of the short storage pixel and a long exposure left image #i formed of the pixel value of the long storage pixel as is the case with the separation unit 81 in FIG. 3. The separation unit 301 supplies the short exposure left image #i to the difference detection unit 303 and supplies the long exposure left image #i to the difference detection unit 304.

The separation unit 302 makes the ith frame the current frame and reads a long/short exposure right image #i being the long/short exposure right image of the ith frame from the SDRAM 282-2. The separation unit 302 separates the pixel value of the short storage pixel and the pixel value of the long storage pixel from the read long/short exposure right image #i and generates a short exposure right image #i formed of the pixel value of the short storage pixel and a long exposure right image #i formed of the pixel value of the long storage pixel as is the case with the separation unit 81. The separation unit 302 supplies the short exposure right image #i to the difference detection unit 303 and supplies the long exposure right image #i to the difference detection unit 304.

The difference detection unit 303 (first difference detection unit) generates a SAD table according to a block matching method by using the short exposure left image #i supplied from the separation unit 301 and the short exposure right image #i supplied from the separation unit 302.

Specifically, the difference detection unit 303 divides the short exposure left image #i into blocks each having a predetermined size and makes the same standard image blocks. The difference detection unit 303 also divides the short exposure right image #i into blocks each having the same size as the size of the standard image block and makes the same reference image blocks. The difference detection unit 303 makes a line extending in a horizontal direction around a center of the standard image block an area to be searched for each standard image block.

The difference detection unit 303 (first difference detection unit) detects a sum of absolute differences (SAD value) of respective pixels between the standard image block and each of a plurality of reference image blocks a center of which is located within the area to be searched of the standard image block as difference information for each standard image block. The difference detection unit 303 generates the SAD table in which a vector indicating a relative position of a pair of the standard image block and each reference image block within the area to be searched and the difference information of the pair are associated with each other for each standard image block.

Meanwhile, the area to be searched is the line extending in the horizontal direction around the center of the standard image block, so that a position in a vertical direction of the reference image block forming the pair corresponding to the difference information is the same as that of the standard image block.

The difference detection unit 303 supplies the standard image block and the SAD table to the combining unit 306 for each standard image block.

The difference detection unit 304 (second difference detection unit) generates the SAD table for each standard image block according to the block matching method as is the case with the difference detection unit 303 by using the long exposure left image #i supplied from the separation unit 301 and the long exposure right image #i supplied from the separation unit 302. The difference detection unit 304 supplies the standard image block and the SAD table to the combining unit 306 for each standard image block.

The motion vector detection unit 305 reads the long/short exposure right image #i from the SDRAM 281-2. The motion vector detection unit 305 detects a motion vector #i on the basis of the read long/short exposure right image #i as is the case with the motion vector detection unit 55 in FIG. 1 or the motion vector detection unit 220 in FIG. 16. The motion vector detection unit 305 supplies the detected motion vector #i to the combining unit 306.

The combining unit 306 reads a depth map #i−1 of an (i−1)th frame from the frame memory 307 as the depth map of the past frame from the frame memory 307. The combining unit 306 combines the SAD tables supplied from the difference detection units 303 and 304 on the basis of the standard image blocks and the motion vector #i which are input and the read depth map #i−1 for each standard image block. The combining unit 306 generates minimum difference information as the depth value of the ith frame on the basis of the combined SAD table for each standard image block.

The combining unit 306 supplies a depth map #i being the depth map formed of the depth value of each standard image block of the ith frame to the correction unit 284 in FIG. 19 and supplies the same to the frame memory 307.

The frame memory 307 holds the depth map #i−1 supplied from the combining unit 306 when the (i−1)th frame is made the current frame. The frame memory 307 also holds the depth map #i supplied from the combining unit 306. The depth map #i is read to be used when the current frame is an (i+1)th frame.

Meanwhile, although the motion vector detection unit 305 herein detects the motion vector #i by using the long/short exposure right image #i, this may also detect the motion vector #i by using the long/short exposure left image #i.

Also, although the short exposure right image #i is divided into the standard image blocks and the short exposure left image #i is divided into the reference image blocks in the depth map detection unit 283, it is also possible that the short exposure left image #i is divided into the standard image blocks and the short exposure right image #i is divided into the reference image blocks.

Furthermore, the standard image block may also be formed of one pixel. In this case, the depth value is generated in pixel unit.

(Configuration Example of Combining Unit)

Figure 21:
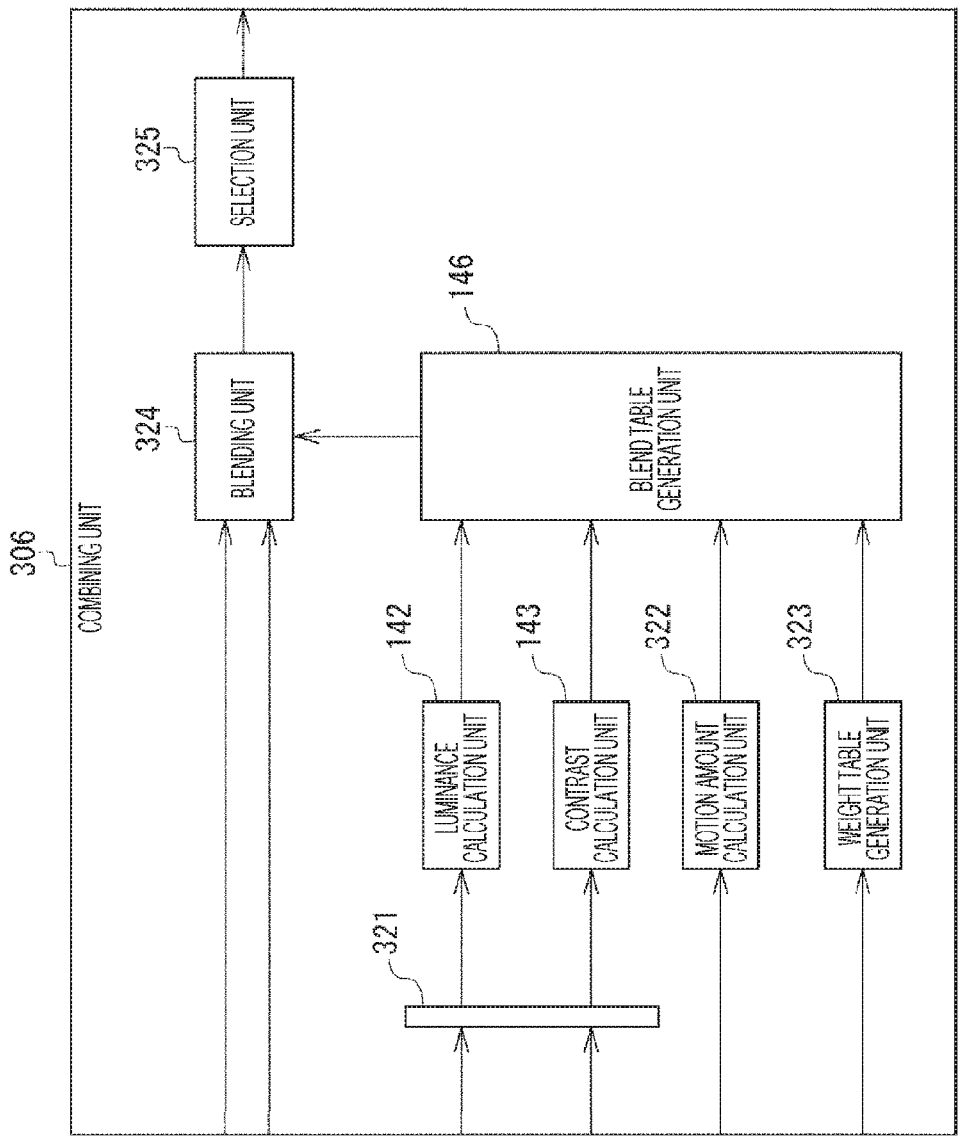
FIG. 21 is a block diagram illustrating a configuration example of a combining unit in FIG. 20.

FIG. 21 is a block diagram illustrating a configuration example of the combining unit 306 in FIG. 20.

In the configuration illustrated in FIG. 21, the same reference sign is assigned to the same configuration as the configuration in FIG. 7. Overlapping description is appropriately omitted.

The combining unit 306 in FIG. 21 is formed of a luminance calculation unit 142, a contrast calculation unit 143, a blend table generation unit 146, a selection unit 321, a motion amount calculation unit 322, a weight table generation unit 323, a blending unit 324, and a selection unit 325.

The selection unit 321 of the combining unit 306 selects one of the pixel value of the short exposure right image #i from the difference detection unit 303 in FIG. 20 and the pixel value of the long exposure right image #i from the difference detection unit 304 in FIG. 20 with a better SN ratio for each pixel of the standard image block as is the case with the selection unit 141. The selection unit 321 supplies the selected pixel value of each pixel of the standard image block to the luminance calculation unit 142 and the contrast calculation unit 143.

The motion amount calculation unit 322 determines a motion amount blend value BlendM on the basis of the motion vector supplied from the motion vector detection unit 305 in FIG. 20 and supplies the same to the blend table generation unit 146 as is the case with the motion amount calculation unit 144.

The weight table generation unit 323 reads the depth map #i−1 from the frame memory 307 in FIG. 20. The weight table generation unit 323 generates a weight table as is the case with a weight table generation unit 145 on the basis of the read depth map #i−1.

According to this, one being a maximum value is registered in the weight table as a weight for a pair of the reference image block the vector of which indicating the relative position from the standard image block is the vector indicated by the depth value of the depth map #i−1 of the standard image block and the standard image block. Then, a smaller weight is registered for the pair of the reference image block farther from the reference image block and the standard image block. The weight table generation unit 323 supplies the generated weight table to the blend table generation unit 146.

The blending unit 324 combines the SAD tables supplied from the difference detection units 303 and 304 in FIG. 20 on the basis of the blend table supplied from the blend table generation unit 146 as is the case with a blending unit 147. The blending unit 324 supplies the combined SAD table to the selection unit 325.

The selection unit 325 detects minimum difference information out of pieces of difference information registered in the SAD table supplied from the blending unit 324 as the depth value. The selection unit 325 supplies the depth map #i formed of the depth value detected for each standard image block of the current frame to the correction unit 284 in FIG. 19 and supplies the same to the frame memory 307.

From above, in the combining unit 306, as is the case with the combining unit 85 in FIG. 7, any one of the difference information of the short exposure image and the difference information of the long exposure image is preferentially used for detecting the depth map on the basis of luminance, contrast, a motion amount and a change amount of the depth map of the standard image block. Therefore, detection accuracy of the depth map is improved.

Meanwhile, when the standard image block is formed of one pixel, the luminance calculation unit 142 may determine a luminance blend value BlendL on the basis of not the pixel value of the standard image block but the pixel values of a peripheral pixel group including the standard image block. Similarly, the contrast calculation unit 143 may determine a contrast blend value BlendC on the basis of the pixel values of the peripheral pixel group including the standard image block.

(Description of Process of Digital Camera)

Figure 22:
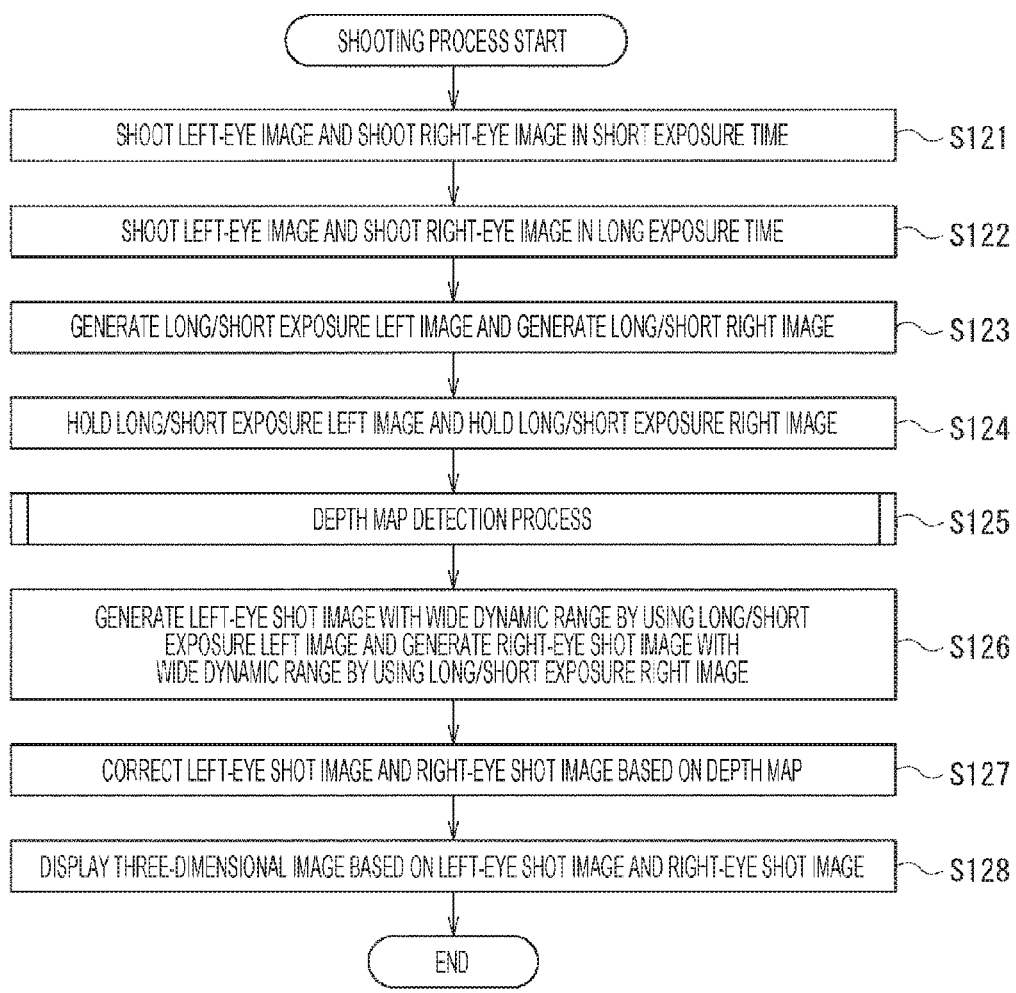
FIG. 22 is a flowchart illustrating a shooting process of the digital camera in FIG. 19.

FIG. 22 is a flowchart illustrating a shooting process of the digital camera 280 in FIG. 19. The shooting process is performed in frame unit, for example.

At step S121 in FIG. 22, the short storage pixel of the image sensor 52 of the shooting unit 281-1 shoots the left-eye image in the short exposure time and the short storage pixel of the image sensor 52 of the shooting unit 281-2 shoots the right-eye image in the short exposure time. The short storage pixel of the image sensor 52 of each of the shooting units 281-1 and 281-2 supplies a pixel signal obtained as a result of shooting to the camera signal processor 53.

At step S122 the long storage pixel of the image sensor 52 of the shooting unit 281-1 shoots the left-eye image in the long exposure time and the long storage pixel of the image sensor 52 of the shooting unit 281-2 shoots the right-eye image in the long exposure time. The long storage pixel of the image sensor 52 of each of the shooting units 281-1 and 281-2 supplies the pixel signal obtained as a result of the shooting to the camera signal processor 53.

At step S123, the camera signal processor 53 of the shooting unit 281-1 generates the long/short exposure left image from an analog image signal formed of the pixel signals of the short storage pixel and the long storage pixel supplied from the image sensor 52 and supplies the same to the SDRAM 282-1. The camera signal processor 53 of the shooting unit 281-2 also generates the long/short exposure right image from the analog image signal formed of the pixel signals of the short storage pixel and the long storage pixel supplied from the image sensor 52 and supplies the same to the SDRAM 282-2.

At step S124, the SDRAM 282-1 holds the long/short exposure left image in frame unit supplied from the shooting unit 281-1 and the SDRAM 282-2 holds the long/short exposure right image in frame unit supplied from the shooting unit 281-2.

At step S125, the depth map detection unit 283 performs a depth map detection process of detecting the depth map on the basis of the long/short exposure left image held in the SDRAM 282-1 and the long/short exposure right image held in the SDRAM 282-2 for the current frame. The depth map detection process is described in detail with reference to FIG. 23 to be described later.

At step S126, the correction unit 284 reads the long/short exposure left image of the current frame from the SDRAM 282-1 and generates the left-eye shot image with the wide dynamic range by using the long/short exposure image. The correction unit 284 also reads the long/short exposure right image of the current frame from the SDRAM 282-2 and generates the right-eye shot image with the wide dynamic range by using the long/short exposure right image.

At step S127, the correction unit 284 corrects the left-eye shot image and the right-eye shot image on the basis of the depth map supplied from the depth map detection unit 283. The correction unit 284 supplies the corrected left-eye shot image and right-eye shot image to the display unit 286.

At step S128, the display control unit 285 controls the display unit 61 on the basis of the left-eye shot image and right-eye shot image supplied from the correction unit 284 and allows the display unit 286 to display the three-dimensional image. Then, the procedure ends.

Figure 23:
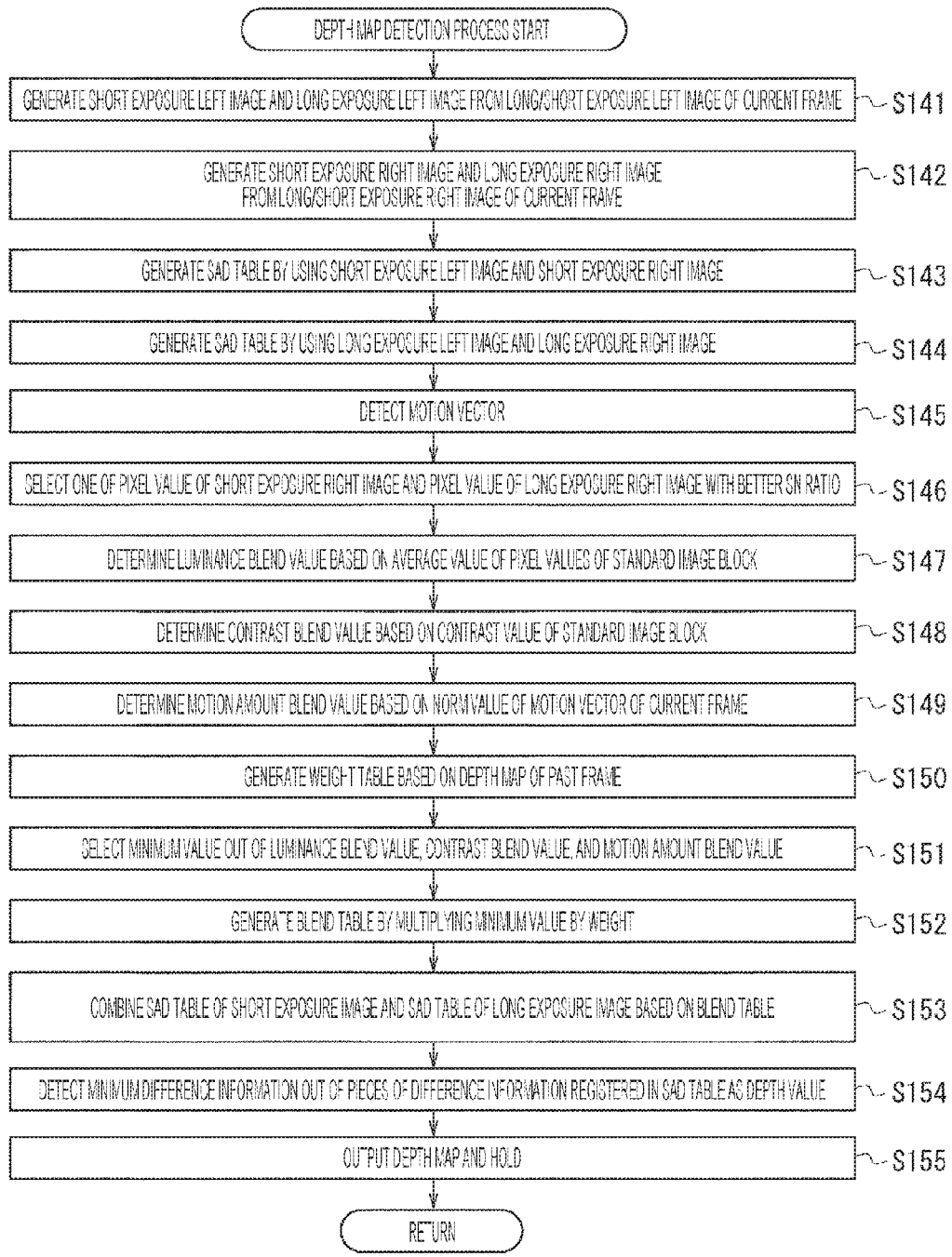
FIG. 23 is a flowchart illustrating a depth map detection process in FIG. 22 in detail.
Figure 24:
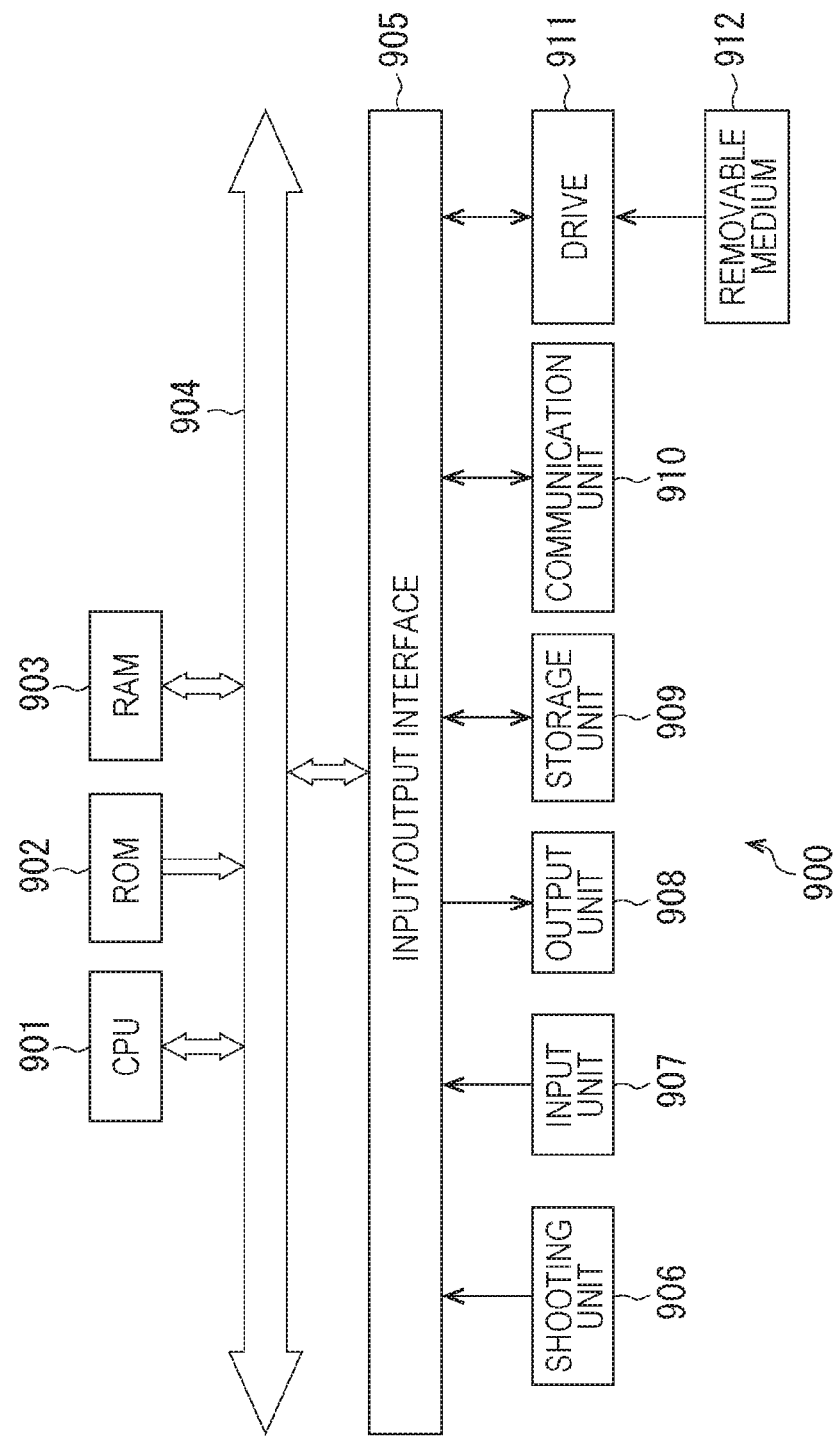
FIG. 24 is a block diagram illustrating a configuration example of hardware of a computer.

FIG. 23 is a flowchart illustrating the depth map detection process at step S125 in FIG. 22 in detail.

At step S141 in FIG. 23, the separation unit 301 of the depth map detection unit 283 reads the long/short exposure left image of the current frame from the SDRAM 282-1 and generates the short exposure left image and the long exposure left image from the long/short exposure left image. The separation unit 301 supplies the short exposure left image to the difference detection unit 303 and supplies the long exposure left image to the difference detection unit 304.

At step S142, the separation unit 302 reads the long/short exposure right image of the current frame from the SDRAM 282-2 and generates the short exposure right image and the long exposure right image from the long/short exposure right image. The separation unit 302 supplies the short exposure right image to the difference detection unit 303 and supplies the long exposure right image to the difference detection unit 304. Processes at subsequent step S143 to step S154 are performed for each standard image block.

At step S143, the difference detection unit 303 generates the SAD table according to the block matching method by using the short exposure left image supplied from the separation unit 301 and the short exposure right image supplied from the separation unit 302. The difference detection unit 303 supplies the current standard image block and the SAD table to the combining unit 306.

At step S144, the difference detection unit 304 generates the SAD table according to the block matching method by using the long exposure left image supplied from the separation unit 301 and the long exposure right image supplied from the separation unit 302. The difference detection unit 304 supplies the current standard image block and the SAD table to the combining unit 306.

At step S145, the motion vector detection unit 305 reads the long/short exposure right image of the current frame from the SDRAM 281-2 and detects the motion vector of the current standard image block of the current frame on the basis of the long/short exposure right image. The motion vector detection unit 305 supplies the detected motion vector to the combining unit 306.

At step S146, the selection unit 321 of the combining unit 306 (FIG. 21) selects one of the pixel value of the short exposure right image from the difference detection unit 303 and the pixel value of the long exposure right image from the difference detection unit 304 with a better SN ratio for each pixel of the current standard image block. The selection unit 321 supplies the selected pixel value of each pixel of the standard image block to the luminance calculation unit 142 and the contrast calculation unit 143.

Processes at steps S147 and S148 are similar to processes at steps S36 and S37 in FIG. 10, so that description thereof is omitted.

At step S149, the motion amount calculation unit 322 determines the motion amount blend value BlendM on the basis of the norm value of the motion vector of the current standard image block of the current frame supplied from the motion vector detection unit 305 and supplies the same to the blend table generation unit 146.

At step S150, the weight table generation unit 323 reads the depth map of the past frame from the frame memory 307 in FIG. 20 and generates the weight table on the basis of the depth map. The weight table generation unit 323 supplies the generated weight table to the blend table generation unit 146.

Processes at steps S151 and S152 are similar to processes at steps S40 and S41 in FIG. 10, so that description thereof is omitted.

At step S153, the blending unit 324 combines the SAD table of the short exposure image supplied from the difference detection unit 303 and the SAD table of the long exposure image supplied from the difference detection unit 304 on the basis of the blend table supplied from the blend table generation unit 146. The blending unit 324 supplies the combined SAD table to the selection unit 325.

At step S154, the selection unit 325 detects the minimum difference information out of the pieces of difference information registered in the SAD table supplied from the blending unit 324 as the depth value.

At step S155, the selection unit 325 outputs the depth map formed of the depth value detected for each standard image block of the current frame to the correction unit 284 and supplies the same to the frame memory 307 to hold. The depth map held in the frame memory 307 is used as the depth map of the past frame in the process at step S150 when a next frame of the current frame at present is newly made the current frame. After the process at step S155, the procedure returns to step S125 in FIG. 22 to shift to step S126.

As described above, the digital camera 280 generates the SAD table of the short exposure image and the SAD table of the long exposure image and combines the SAD tables of the short exposure image and the long exposure image on the basis of the short exposure image or the long exposure image. Then, the digital camera 11 detects the depth map on the basis of the combined SAD table.

Therefore, it is possible to detect the depth map by preferentially using one suitable for the luminance and the contrast of the short exposure image or the long exposure image of the SAD tables of the short exposure image and the long exposure image. As a result, detection accuracy of the depth map is improved.

Meanwhile, although the blend table is generated by using all of the average value of the pixel values and the contrast value of the short exposure image (short exposure right image) or the long exposure image (long exposure right image), the motion amount of the past frame, and the weight table in the first to fourth embodiments, it is also possible to generate the blend table by using a part of them.

Also, the information used when generating the blend table is not limited to the above-described example; for example, a noise amount may also be used. When the noise amount is used when generating the blend table, the blend table is generated such that the difference information of the long exposure image with the better SN ratio is preferentially used when the noise amount is large, for example.

Fifth Embodiment

<Description of Computer to which Present Disclosure is Applied>

A series of processes described above may be executed by hardware or by software. When a series of processes is executed by the software, a program which forms the software is installed on a computer. Herein, the computer includes a computer built in dedicated hardware, a general-purpose personal computer, for example, capable of executing various functions by various programs installed and the like.

FIG. 24 is a block diagram illustrating a configuration example of the hardware of the computer which executes a series of processes described above by the program.

In a computer 900, a central processing unit (CPU) 901, a read only memory (ROM) 902, and a random access memory (RAM) 903 are connected to one another through a bus 904.

An input/output interface 905 is further connected to the bus 904. A shooting unit 906, an input unit 907, an output unit 908, a storage unit 909, a communication unit 910, and a drive 911 are connected to the input/output interface 905.

The shooting unit 906 is formed of a shooting unit 41, a shooting unit 182, or shooting units 281-1 and 281-2 described-above, for example. The shooting unit 906 shoots in two or more exposure times and supplies an image obtained as a result to the storage unit 909 to store.

The input unit 907 is formed or a keyboard, a mouse, a microphone and the like. The output unit 908 is formed of a display, a speaker and the like. The storage unit 909 is formed of a hard disk, a non-volatile memory and the like. The communication unit 910 is formed of a network interface and the like. The drive 911 drives a removable medium 912 such as a magnetic disc, an optical disc, a magnetooptical disc, or a semiconductor memory.

In the computer 900 configured in the above described manner, the CPU 901 loads the program stored in the storage unit 909, for example, on the RAM 903 through the input/output interface 905 and the bus 904 to execute, and according to this, a series of processes described above is performed.

The program executed by the computer 900 (CPU 901) may be recorded in the removable medium 912 as a package medium and the like to be provided, for example. Also, the program may be provided by means of a wired or wireless transmission medium such as a local area network, the Internet, and digital broadcasting.

In the computer 900, the program may be installed on the storage unit 909 through the input/output interface 905 by mounting the removable medium 912 on the drive 911. Also, the program may be received by the communication unit 910 by means of the wired or wireless transmission medium to be installed on the storage unit 909. In addition, the program may be installed in advance on the ROM 902 and the storage unit 909.

Meanwhile, the program executed by the computer 900 may be the program of which processes are performed in chronological order in the order described in this description or may be the program of which processes are performed in parallel or at required timing such as when a call is issued.

Also, the effect described in this specification is illustrative only and is not limitative; there may also be another effect.

The embodiment of the present disclosure is not limited to the above-described embodiments and may be variously changed without departing from the scope of the present disclosure.

For example, in the fourth embodiment, it is also possible to shoot the left-eye and the right-eye images in the long exposure time, the middle exposure time, and the short exposure time, and combine the SAD tables of the long exposure time, the middle exposure time, and the short exposure time to generate the depth map as in the second embodiment.

Also, the images corresponding to the SAD tables to be combined may be the images with different shooting conditions other than the exposure time (for example, sensitivity, a shooting gain (analog gain), a focusing position and the like).

When the images are shot with different sensitivities as the shooting condition, the sensitivities of pixel filters of the image sensor are made different between a green (G) pixel and red and blue (RB) pixels, between a white (W) pixel and red, green, and blue (RGB) pixels, and between the RGB pixels and an IR (infrared) pixel.

Also, when the images are shot with different focus positions as the shooting condition, for example, shapes of on-chip lenses provided for respective one or more pixels of the image sensor are made different from one another. According to this, a long-distance image and a short-distance image may be simultaneously shot. The digital camera detects the motion vector and the depth map by preferentially using the difference information of one of the long-distance image and the short-distance image which is in focus according to a distance to the subject, thereby improving the detection accuracy.

Furthermore, as the method of detecting the motion vector, in addition to the block matching method, a method using feature point correspondence and a method of calculating an optical flow may also be adopted.

Also, as the target to be combined, in addition to the SAD table, a result of face recognition, contrast information of contrast AF and the like may also be adopted.

Meanwhile, the present disclosure may also have a following configuration.

(1)

An image processing device including:

a first difference detection unit which detects difference information of a first image of first and second frames shot with a first shooting condition;

a second difference detection unit which detects difference information of a second image of the first and second frames shot with a second shooting condition; and a combining unit which combines the difference information of the first image detected by the first difference detection unit and the difference information of the second image detected by the second difference detection unit on the basis of the first or second image and generates a motion vector of the first frame on the basis of the combined difference information.

(2)

The image processing device according to (1) described above, wherein the combining unit is configured to combine on the basis of the image with a better SN ratio out of the first and second images.

(3)

The image processing device according to (1) or (2) described above, wherein the combining unit is configured to combine on the basis of luminance of the first or second image.

(4)

The image processing device according to any one of (1) to (3) described above, wherein the combining unit is configured to combine on the basis of contrast of the first or second image.

(5)

The image processing device according to any one of (1) to (4) described above, wherein the combining unit is configured to combine on the basis of the first or second image and a motion vector of a frame before the first frame.

(6)

The image processing device according to (5) described above, further including:

a blend ratio determination unit which determines a blend ratio of the difference information of the first image and the difference information of the second image on the basis of the first or second image and the motion vector of the frame before the first frame, wherein the combining unit is configured to combine on the basis of the blend ratio determined by the blend ratio determination unit.

(7)

The image processing device according to any one of (1) to (6) described above, configured such that an exposure time, sensitivity, a shooting gain, or a focusing position is different between the first and second shooting conditions.

(8)

The image processing device according to any one of (1) to (7) described above, further including:

a first motion detection unit which detects a first motion vector by using the first and second images of the first frame; and a second motion detection unit which detects a second motion vector by using the first and second images of the second frame; wherein the combining unit is configured to combine on the basis of the first or second image, the first motion vector, and the second motion vector.

(9)

An image processing method including:

a first difference detection step of detecting difference information of a first image of first and second frames shot with a first shooting condition;

a second difference detection step of detecting difference information of a second image of the first and second frames shot with a second shooting condition; and a combining step of combining the difference information of the first image detected by a process at the first difference detection step and the difference information of the second image detected by a process at the second difference detection step on the basis of the first or second image and generating a motion vector of the first frame on the basis of the combined difference information by an image processing device.

(10)

A solid-state imaging device including:

a shooting unit which shoots with first and second shooting conditions;

a first difference detection unit which detects difference information of a first image of first and second frames shot by the shooting unit with the first shooting condition;

a second difference detection unit which detects difference information of a second image of the first and second frames shot by the shooting unit with the second shooting condition; and a combining unit which combines the difference information of the first image detected by the first difference detection unit and the difference information of the second image detected by the second difference detection unit on the basis of the first or second image and generates a motion vector of the first frame on the basis of the combined difference information.

(11)

An image processing device including:

a first difference detection unit which detects difference information between a left-eye image and a right-eye image shot with a first shooting condition;

a second difference detection unit which detects difference information between the left-eye image and the right-eye image shot with a second shooting condition; and a combining unit which combines the difference information with the first shooting condition detected by the first difference detection unit and the difference information with the second shooting condition detected by the second difference detection unit on the basis of the left-eye image shot with the first or second shooting condition or the right-eye image shot with the first or second shooting condition and generates the combined difference information as a depth value.

(12)
The image processing device according to (11) described above, wherein
the combining unit is configured to combine on the basis of the image with a better SN ratio out of the left-eye image shot with the first shooting condition and the left-eye image shot with the second shooting condition or the image with a better SN ratio out of the right-eye image shot with the first shooting condition and the right-eye image shot with the second shooting condition.

(13)
The image processing device according to (11) or (12) described above, wherein
the combining unit is configured to combine on the basis of luminance of the left-eye image shot with the first or second shooting condition or the right-eye image shot with the first or second shooting condition.

(14)
The image processing device according to any one of (11) to (13) described above, wherein
the combining unit is configured to combine on the basis of contrast of the left-eye image shot with the first or second shooting condition or the right-eye image shot with the first or second shooting condition.

(15)
The image processing device according to any one of (11) to (14) described above, wherein
the combining unit is configured to combine on the basis of the left-eye image shot with the first or second shooting condition or the right-eye image shot with the first or second shooting condition and a past depth value.

(16)
The image processing device according to any one of (11) to (15) described above, wherein
the combining unit is configured to combine on the basis of the left-eye image shot with the first or second shooting condition or the right-eye image shot with the first or second shooting condition and a motion vector of the image.

(17)
The image processing device according to any one of (11) to (16) described above,
configured such that an exposure time, sensitivity, a shooting gain, or a focusing position is different between the first and second shooting conditions.

(18)
An image processing method including:
a first difference detection step of detecting difference information between a left-eye image and a right-eye image shot with a first shooting condition;
a second difference detection step of detecting difference information between the left-eye image and the right-eye image shot with a second shooting condition; and
a combining step of combining the difference information with the first shooting condition detected by a process at the first difference detection step and the difference information with the second shooting condition detected by a process at the second difference detection step on the basis of the left-eye image shot with the first or second shooting condition or the right-eye image shot with the first or second shooting condition and generating the combined difference information as a depth value by an image processing device.

(19)
A solid-state imaging device including:
a shooting unit which shoots a left-eye image and a right-eye image with first and second shooting conditions;
a first difference detection unit which detects difference information between the left-eye image and the right-eye image shot by the shooting unit with the first shooting condition;
a second difference detection unit which detects difference information between the left-eye image and the right-eye image shot by the shooting unit with the second shooting condition; and
a combining unit which combines the difference information with the first shooting condition detected by the first difference detection unit and the difference information with the second shooting condition detected by the second difference detection unit on the basis of the left-eye image shot with the first or second shooting condition or the right-eye image shot with the first or second shooting condition and generates the combined difference information as a depth value.

REFERENCE SIGNS LIST

11 Digital camera
41 Shooting unit
55 Motion vector detection unit
83, 84 Difference detection unit
146 Blend table generation unit
147 Blending unit
221, 222 Motion detection unit
280 Digital camera
281-1, 281-2 Shooting unit
303, 304 Difference detection unit
306 Combining unit

The invention claimed is:
1. An image processing device comprising:
a first difference detection unit which detects difference information of a first image of first and second frames shot with a first shooting condition;
a second difference detection unit which detects difference information of a second image of the first and second frames shot with a second shooting condition; and
a combining unit which combines the difference information of the first image detected by the first difference detection unit and the difference information of the second image detected by the second difference detection unit on the basis of the first or second image and generates a motion vector of the first frame on the basis of the combined difference information.

2. The image processing device according to claim 1, wherein
the combining unit is configured to combine on the basis of the image with a better SN ratio out of the first and second images.

3. The image processing device according to claim 1, wherein
the combining unit is configured to combine on the basis of luminance of the first or second image.

4. The image processing device according to claim 1, wherein
the combining unit is configured to combine on the basis of contrast of the first or second image.

5. The image processing device according to claim 1, wherein
the combining unit is configured to combine on the basis of the first or second image and a motion vector of a frame before the first frame.

6. The image processing device according to claim 5, further comprising:
a blend ratio determination unit which determines a blend ratio of the difference information of the first image and the difference information of the second image on the basis of the first or second image and the motion vector of the frame before the first frame, wherein
the combining unit is configured to combine on the basis of the blend ratio determined by the blend ratio determination unit.

7. The image processing device according to claim 1, configured such that an exposure time, sensitivity, a shooting gain, or a focusing position is different between the first and second shooting conditions.

8. The image processing device according to claim 1, further comprising:
a first motion detection unit which detects a first motion vector by using the first and second images of the first frame; and
a second motion detection unit which detects a second motion vector by using the first and second images of the second frame; wherein
the combining unit is configured to combine on the basis of the first or second image, the first motion vector, and the second motion vector.

9. An image processing method comprising:
a first difference detection step of detecting difference information of a first image of first and second frames shot with a first shooting condition;
a second difference detection step of detecting difference information of a second image of the first and second frames shot with a second shooting condition; and
a combining step of combining the difference information of the first image detected by a process at the first difference detection step and the difference information of the second image detected by a process at the second difference detection step on the basis of the first or second image and generating a motion vector of the first frame on the basis of the combined difference information
by an image processing device.

10. A solid-state imaging device comprising:
a shooting unit which shoots with first and second shooting conditions;
a first difference detection unit which detects difference information of a first image of first and second frames shot by the shooting unit with the first shooting condition;
a second difference detection unit which detects difference information of a second image of the first and second frames shot by the shooting unit with the second shooting condition; and
a combining unit which combines the difference information of the first image detected by the first difference detection unit and the difference information of the second image detected by the second difference detection unit on the basis of the first or second image and generates a motion vector of the first frame on the basis of the combined difference information.

11. An image processing device comprising:
a first difference detection unit which detects difference information between a left-eye image and a right-eye image shot with a first shooting condition;
a second difference detection unit which detects difference information between the left-eye image and the right-eye image shot with a second shooting condition; and
a combining unit which combines the difference information with the first shooting condition detected by the first difference detection unit and the difference information with the second shooting condition detected by the second difference detection unit on the basis of the left-eye image shot with the first or second shooting condition or the right-eye image shot with the first or second shooting condition and generates the combined difference information as a depth value.

12. The image processing device according to claim 11, wherein
the combining unit is configured to combine on the basis of the image with a better SN ratio out of the left-eye image shot with the first shooting condition and the left-eye image shot with the second shooting condition or the image with a better SN ratio out of the right-eye image shot with the first shooting condition and the right-eye image shot with the second shooting condition.

13. The image processing device according to claim 11, wherein
the combining unit is configured to combine on the basis of luminance of the left-eye image shot with the first or second shooting condition or the right-eye image shot with the first or second shooting condition.

14. The image processing device according to claim 11, wherein
the combining unit is configured to combine on the basis of contrast of the left-eye image shot with the first or second shooting condition or the right-eye image shot with the first or second shooting condition.

15. The image processing device according to claim 11, wherein
the combining unit is configured to combine on the basis of the left-eye image shot with the first or second shooting condition or the right-eye image shot with the first or second shooting condition and a past depth value.

16. The image processing device according to claim 11, wherein
the combining unit is configured to combine on the basis of the left-eye image shot with the first or second shooting condition or the right-eye image shot with the first or second shooting condition and a motion vector of the image.

17. The image processing device according to claim 11, configured such that an exposure time, sensitivity, a shooting gain, or a focusing position is different between the first and second shooting conditions.

18. An image processing method comprising:
a first difference detection step of detecting difference information between a left-eye image and a right-eye image shot with a first shooting condition;
a second difference detection step of detecting difference information between the left-eye image and the right-eye image shot with a second shooting condition; and
a combining step of combining the difference information with the first shooting condition detected by a process at the first difference detection step and the difference information with the second shooting condition detected by a process at the second difference detection step on the basis of the left-eye image shot with the first or second shooting condition or the right-eye image shot with the first or second shooting condition and generating the combined difference information as a depth value by an image processing device.

19. A solid-state imaging device comprising:
a shooting unit which shoots a left-eye image and a right-eye image with first and second shooting conditions;
a first difference detection unit which detects difference information between the left-eye image and the right-eye image shot by the shooting unit with the first shooting condition;
a second difference detection unit which detects difference information between the left-eye image and the right-eye image shot by the shooting unit with the second shooting condition; and
a combining unit which combines the difference information with the first shooting condition detected by the first difference detection unit and the difference information with the second shooting condition detected by the second difference detection unit on the basis of the left-eye image shot with the first or second shooting condition or the right-eye image shot with the first or second shooting condition and generates the combined difference information as a depth value.

* * * * *